US007211782B2

(12) United States Patent  
Tobiason et al.

(10) Patent No.: US 7,211,782 B2
(45) Date of Patent: May 1, 2007

(54) PRECISION MEASURING GAUGES WITH OPTICAL FIBER OUTPUT CHANNELS

(75) Inventors: Joseph D. Tobiason, Woodinville, WA (US); Avron Zwilling, Redmond, WA (US); Casey Emtman, Sammamish, WA (US); Scott Harsila, Seattle, WA (US); Mike Goldsworthy, Seattle, WA (US); Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 110 days.

(21) Appl. No.: 10/901,701

(22) Filed: Jul. 29, 2004

(65) Prior Publication Data

US 2005/0224705 A1 Oct. 13, 2005

Related U.S. Application Data

(60) Provisional application No. 60/560,995, filed on Apr. 9, 2004.

(51) Int. Cl.
*G01J 1/04* (2006.01)
*G02B 6/36* (2006.01)

(52) U.S. Cl. .................. 250/227.11; 250/231.13; 385/53

(58) Field of Classification Search ........... 250/227.11, 250/231.13–231.18, 237 G; 33/558, 561, 33/707; 310/49 R, 80; 385/53, 88–90
See application file for complete search history.

(56) References Cited

U.S. PATENT DOCUMENTS 3,483,389 A * 12/1969 Cronin .................. 250/566
4,162,399 A * 7/1979 Hudson ................. 250/231.14
4,671,659 A * 6/1987 Rempt et al. .............. 356/477
4,733,071 A   3/1988 Tokunaga
4,751,411 A   6/1988 Fukaya et al.
5,390,424 A   2/1995 Butter et al.
5,808,730 A * 9/1998 Danielian et al. .......... 356/73.1
5,909,283 A * 6/1999 Eselun ..................... 356/499
6,905,258 B2  6/2005 Tobiason
2004/0011948 A1  1/2004 Tobiason
2004/0217268 A1  11/2004 Tobiason et al.
2004/0222365 A1  11/2004 Tobiason
2005/0068539 A1  3/2005 Tobiason

OTHER PUBLICATIONS

Sawada, R., et al., "Monolithic-Integrated Microlaser Encoder," *Applied Optics* 38(33):6866-6873, Nov. 20, 1999.

\* cited by examiner

*Primary Examiner*—Stephone B. Allen
(74) *Attorney, Agent, or Firm*—Christensen O'Connor Johnson Kindness PLLC

(57) ABSTRACT

All-optical output precision measuring gauges that sense the displacement of an internal scale grating are disclosed. Each type of gauge includes a compact, miniature, or ultra-miniature optical readhead that includes a light source for transmitting light to the scale grating, and optical-fiber detector channels for receiving light from the scale grating and outputting optical measuring signals from the gauge. In various embodiments, the optical-fiber detector channels have respective phase grating masks for receiving a periodic light pattern that moves in correspondence to the scale grating, and the channels are arranged in balanced pairs. In various embodiments, the optical readhead is an interferometric-type optical readhead that provides a measuring resolution as fine as 10–50 nanometers or less. In various embodiments, the gauge is provided in an unprecedented miniature size. In various embodiments, the gauge is motorized to provide a precision actuator.

21 Claims, 21 Drawing Sheets

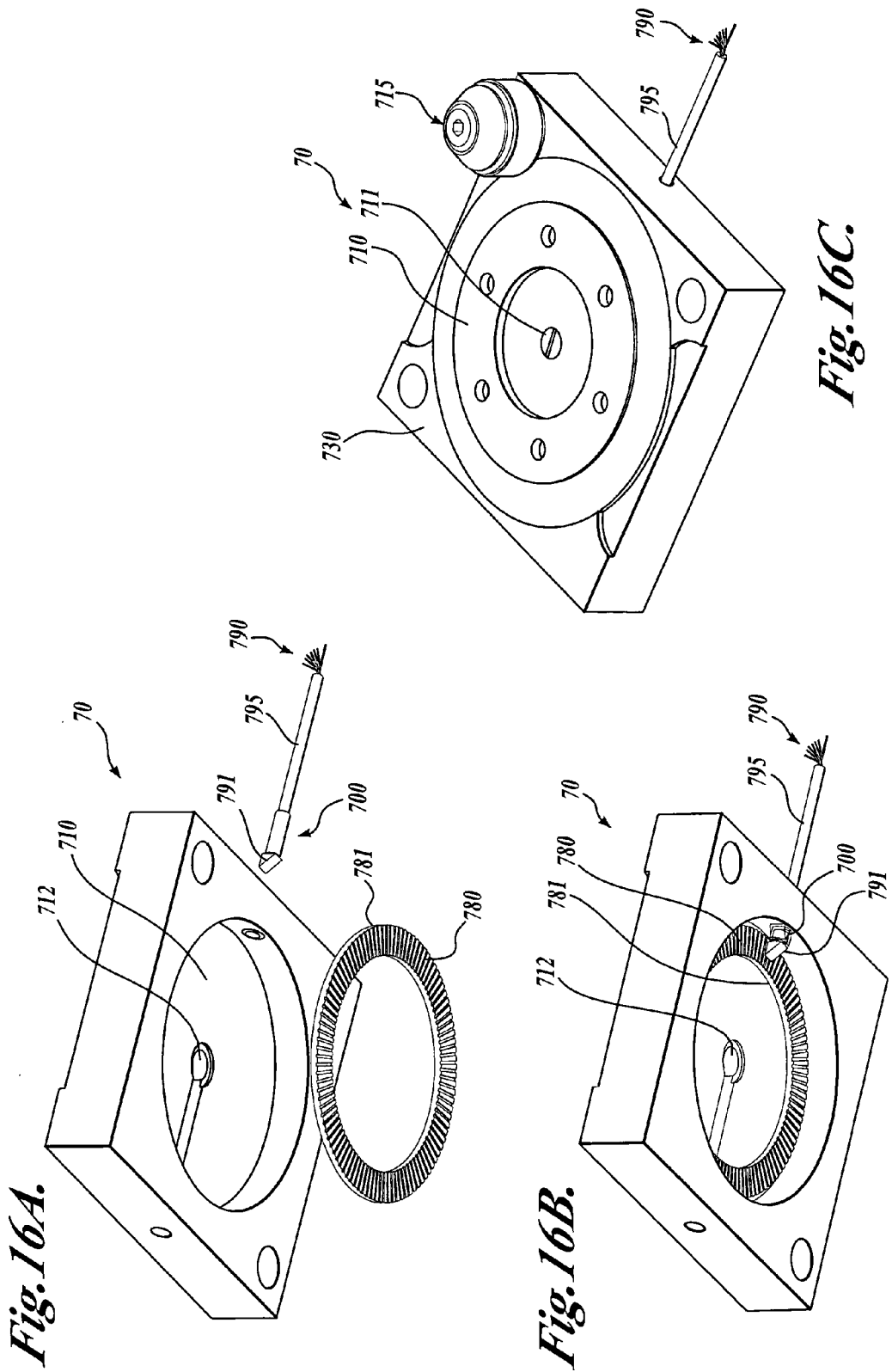

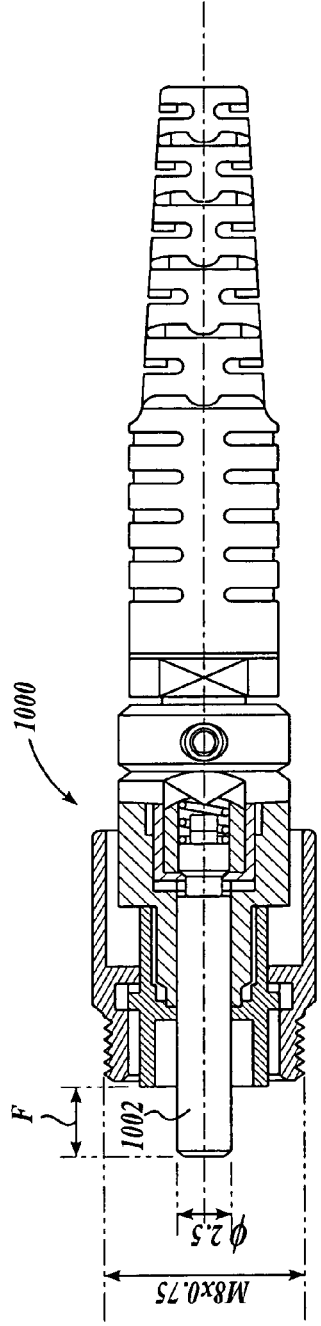
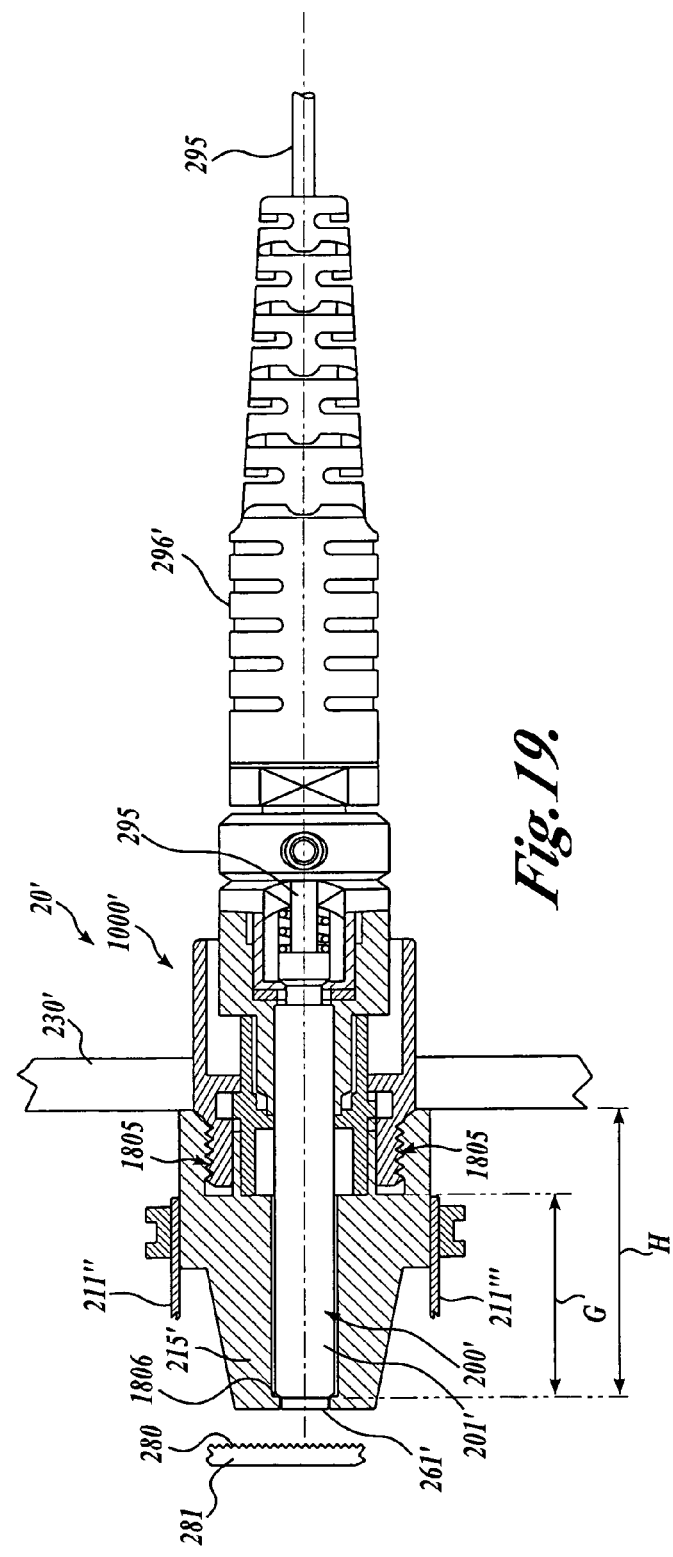

PRECISION MEASURING GAUGES WITH OPTICAL FIBER OUTPUT CHANNELS

CROSS-REFERENCE TO RELATED APPLICATION

This application claims the benefit of U.S. Provisional Application No. 60/560,995, filed Apr. 9, 2004

FIELD OF THE INVENTION

This invention relates generally to precision measuring gauges and actuators, and particularly to contact-type precision measuring gauges and actuators that use internal grating scales and optical displacement measuring systems for determining the grating scale displacement. More particularly, this invention relates to an all-optical measuring system for such gauges, using optical fibers as receiver and output channels to provide an ultra-compact high accuracy system.

BACKGROUND OF THE INVENTION

Various precision measuring gauges for sensing linear, rotary or angular displacement or dimensions are currently available. These gauges are generally based on either optical systems, magnetic scales, inductive transducers, or capacitive transducers.

For gauges based on optical systems, a number of different optical displacement measuring systems have been developed. Typically, for gauges that provide high resolution measurements over a comparatively long measuring range, a measuring signal arising from the displacement of an internal grating scale is detected. In such optical displacement measuring systems, the grating scale is illuminated and a set of photodetectors or a photodetector array is arranged to derive four periodic quadrature-type signals from light fringes that arise from grating scale. However, such optically-based measuring gauges have heretofore had several undesirable limitations. One limitation is that such gauges have reached a typical minimum size that makes their use inconvenient or impossible in a number of applications. Another limitation is that such gauges suffer limitations in converting the high frequency photodetector signals associated with high speed gauge displacements and transmitting those signals over long cables without significant signal loss or interference.

Another limitation is that such gauges are typically "incremental" type gauges, that is, the measuring signals arising from the various periods of the periodic grating scale are indistinguishable from one another. Therefore, for displacements exceeding one period, each increment or period of the scale must be accumulated in order to determine the net displacement of the gauge. Absolute type optical gauges are known. However, such gauges tend to be even larger in size than the aforementioned incremental type gauges. Also, absolute type gauges tend to have even lower measurement cycle rates, and thus also suffer limitations in providing the high frequency photodetector signals needed to track high speed gauge displacements in real time.

Various optical encoder systems utilizing optical fibers are known, such as that disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. However, the accuracy of the resulting encoders have either been relatively crude, or their size has been excessive, or both. Thus, such systems have not been effective for use in precision measuring gauges.

Precision measuring gauges based on magnetic, inductive, or capacitive transducers, in addition to typically providing cruder levels of resolution and accuracy, generally also suffer from the other limitations outlined above.

SUMMARY OF THE INVENTION

The present invention is directed to providing precision measuring gauges that overcome the foregoing and other disadvantages. More specifically, the present invention is directed to "all-optical" precision measuring gauges that are of small size while providing very high accuracy, in addition to having a number of other desirable features. As used herein, the term "all optical" precision measuring gauge means a precision measuring gauge whose output consists exclusively of optical signals, as opposed to electronic signals, which are transmitted via a fiber-optic cable to an interface box that converts received optical signals to electrical signals for further processing.

All-optical precision measuring gauges and/or actuators that sense the displacement of an internal scale grating are disclosed. In accordance with one aspect of the invention, the precision measuring gauges are "contact type" measuring gauges. Each type of gauge and/or actuator includes a compact, miniature, or ultra-miniature optical readhead that includes a light source for transmitting light to the scale grating and detector channels for receiving light from the scale grating. In accordance with one aspect of the invention, the detector channels of the readhead are fiber-optic detector channels, and these same channels provide the measuring signals that are output from the gauge. Electronic gauges, as opposed to all-optical gauges, suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications. It will be appreciated that the fiber-optic all-optical precision measuring gauges of the present invention overcome these limitations.

In accordance with one aspect of the invention, a gauge or actuator includes a fiber-optic readhead that detects the location of the scale grating using multiple fiber-optic detector channels having respective phase grating masks for receiving a periodic light pattern that moves in correspondence to the scale grating.

In accordance with a separate aspect of the invention, the fiber-optic detector channels are arranged in balanced pairs, to provide enhanced accuracy.

In accordance with a further aspect of the invention, three or more balanced pairs of fiber-optic detector channels are signal processed in a manner that provides enhanced accuracy.

In accordance with a separate aspect of the invention, the light source is provided by an optical fiber, to provide an all-optical precision measuring gauge, free of all limitations and costs associated with electronic assembly and electronic signals.

In accordance with a separate aspect of the invention, the various optical fibers of the gauge are selected from various types such that the gauge measurement accuracy is relatively unaffected by bending of the fiber-optic gauge cable, at least within a nominal allowable mechanical bending radius range for the fiber-optic cable.

In accordance with a separate aspect of the invention, various fiber-optic gauge embodiments are constructed in a particularly economical, accurate and/or compact manner.

In accordance with a separate aspect of the invention, various fiber-optic gauge embodiments are constructed such that they may be removably connected to a standard commercially available fiber-optic connector that includes the fiber-optic readhead. The fiber-optic readhead, as well as the fiber-optic cable, of the gauge is thus field-replaceable without gauge disassembly.

In accordance with a separate aspect of the invention, a periodic light pattern that moves in correspondence to the scale grating is an interferometric light pattern, and the fiber-optic readhead that detects the location of the scale grating is a high-resolution interferometric-type fiber-optic readhead similar or identical to one disclosed in U.S. patent application Ser. No. 10/674,619 to Tobiason, which is incorporated herein by reference in its entirety, and which is hereinafter referred to as the '619 Application. Such an interferometric-type fiber-optic readhead provides a gauge that has certain advantages over previously known gauges that have reasonably compact dimensions. For example, compared to known crude fiber-optic gauges and gauges that include "shadow" type, or self-imaging type readheads, this interferometric-type readhead can operate with a relatively smaller scale pitch, in order to conveniently provide finer measurement resolution. Furthermore, such an interferometric-type readhead can operate reliably over a much larger range of operating gaps relative to the scale grating, allowing simpler and more economical gauge fabrications and assembly and more reliable operation.

In accordance with a separate aspect of the invention, a periodic light pattern that moves in correspondence to the scale grating is a self-image light pattern, and the fiber-optic readhead that detects the location of the scale grating is a high accuracy self-image type fiber-optic readhead similar or identical to one disclosed in U.S. patent application Ser. No. 10/298,312 to Tobiason, which is incorporated herein by reference in its entirety, and which is hereinafter referred to as the '312 Application. A self image is also known by other names such as a Talbot image.

In accordance with a separate aspect of the invention, a periodic light pattern that moves in correspondence to the scale grating is a conventional image light pattern and the fiber-optic readhead that detects the location of the scale grating is a miniature imaging type fiber-optic readhead similar or identical to one disclosed in U.S. patent application Ser. No. 10/650,453 to Tobiason, which is incorporated herein by reference in its entirety, and which is hereinafter referred to as the '453 Application.

In accordance with a separate aspect of the invention, the gauge is a "two-dimensional" gauge that provides output signals usable to provide measurement values along at least two measurement axes. In various embodiments, the gauge includes a 2-dimensional fiber-optic readhead similar or identical to one disclosed in U.S. patent application Ser. No. 10/434,508 to Tobiason, which is incorporated herein by reference in its entirety, and which is hereinafter referred to as the '508 Application.

In accordance with a separate aspect of the invention, the gauge is an absolute type measurement gauge that provides output signals usable to provide absolute type measurement values. In various embodiments, the gauge includes an absolute fiber-optic readhead or an absolute portion of a fiber-optic readhead similar or identical to an absolute fiber-optic readhead or a portion of an absolute fiber-optic readhead such as one disclosed in U.S. patent application Ser. No. 10/428,238 to Tobiason, which is incorporated herein by reference in its entirety, and which is hereinafter referred to as the '238 Application. In various embodiments of the absolute type measurement gauge, the gauge includes multiple periodic scale gratings having different periods, and the position of at least one of the scale gratings is detected using a fiber-optic readhead or readhead portion that detects an interferometric light pattern. In various embodiments, the gauge includes an absolute scale pattern on a member that is fixed relative to the periodic scale grating. In one embodiment, the absolute scale pattern is fabricated along a track that is adjacent to a periodic scale grating track on a single member. In one embodiment, the absolute scale pattern provides binary signals usable to determine an absolute position to a resolution that is less than one-half of the period of a periodic scale grating included in the gauge. In one embodiment, the binary absolute scale pattern is read by an absolute portion of a fiber-optic readhead similar or identical to an absolute "binary" fiber-optic readhead or a "binary" portion of an absolute fiber-optic readhead such as one disclosed in the '238 Application.

In accordance with a separate aspect of the invention, a light deflecting element is provided in the gauge to deflect the fiber-optic readhead light path between the basic readhead elements and the scale grating, in a manner similar or identical to that disclosed in the incorporated '619 Application, regardless of the type of fiber-optic readhead used, to allow any desired operable mounting orientation of the readhead in the gauge, as well as any desired orientation of the external fiber-optic gauge cable relative to the gauge.

In accordance with a separate aspect of the invention, in one embodiment a remote interface box is utilized that contains appropriate electronic light sources and photodetectors that interface with the fiber optics to and from one or more fiber-optic gauges according to this invention, and converts received optical signals to a form suitable for further signal processing to determine and/or display the resulting gauge measurement value(s). In one embodiment, the interface box outputs electrical signals comprising quadrature signals. In one embodiment, the quadrature signals are sinusoidal analog signals.

In accordance with another aspect of the invention, the gauge is any measurement gauge that is usable in an application where a gauge having a fiber-optic cable may be used. In accordance with another aspect of the invention, in various embodiments, the gauge provides a measuring resolution less than or equal to at least one of 50, 20 or 10 nanometers. In accordance with another aspect of the invention, in various embodiments, the gauge provides high resolution and high accuracy measurements, while providing at least one outside dimension that is less than or equal to at least one of 20, 15, 10 or 7 millimeters. In accordance with a further aspect of the invention, in various embodiments, the gauge includes an interferometric-type fiber-optic readhead.

In accordance with another aspect of the invention, the gauge is a micrometer or a micrometer head. In accordance with a further aspect of the invention, the micrometer or micrometer head includes a linear scale grating internal to a piece of the micrometer having a diameter that is less than at least one of 15, 10, and 7 millimeters. In accordance with a further aspect of the invention, in various embodiments, the linear scale grating is carried by a spindle shaft of the micrometer or micrometer head. In accordance with a further aspect of the invention, in various embodiments, the linear scale grating is carried entirely within a groove in the spindle shaft. In accordance with a further aspect of the invention, the micrometer or micrometer head includes an interferometric-type fiber-optic readhead. In accordance with a further aspect of the invention, in various embodiments, the scale grating has a period or pitch that is at most 5.0 microns. In accordance with another aspect of the invention, in various embodiments, the micrometer or micrometer head provides a measuring resolution less than or equal to at least one of 100, 50, 20 or 10 nanometers.

In accordance with a another aspect of the invention, in various embodiments, a micrometer or micrometer head or the like, usable as a linear actuator, includes a motor and is usable as a precision actuator. In accordance with a further aspect of the invention, in various embodiments, the motorized micrometer or micrometer head or the like includes an absolute linear scale internal to a piece of the micrometer or micrometer head having a diameter that is less than at least one of 15, 10, and 7 millimeters, and an absolute fiber-optic readhead or an absolute portion of a fiber-optic readhead that provides an absolute measurement signal based on the absolute linear scale. In accordance with a further aspect of the invention, in various embodiments, the motorized micrometer or micrometer head or the like also includes a periodic rotary scale and a complementary fiber-optic readhead, and the absolute measurement signal is combined with a signal derived from the periodic rotary scale to provide a sub-micron absolute positioning measurement signal for the motorized micrometer or micrometer head or the like. In accordance with a further aspect of the invention, in various embodiments, the motorized micrometer or micrometer head or the like includes an interferometric-type fiber-optic readhead.

In accordance with another aspect of the invention, the gauge is a rotary stage, protractor, or the like. In accordance with a further aspect of the invention, the rotary stage or the like includes at least a portion of a circular or cylindrical scale grating. In accordance with a further aspect of the invention, in various embodiments, the rotary stage, protractor, or the like, has a nominal diameter or width dimension less than at least one of 50, or 30 millimeters.

In accordance with another aspect of the invention, in various embodiments, the rotary stage, protractor, or the like, has a thickness dimension less than at least one of 15, 10, or 7.5 millimeters. In accordance with another aspect of the invention, in various embodiments, the rotary stage, protractor, or the like, provides a measuring resolution less than or equal to one of 5, 2, or 1 arc seconds. In accordance with another aspect of the invention, in various embodiments, the rotary stage, protractor, or the like, includes an interferometric-type fiber-optic readhead.

In accordance with another aspect of the invention, in various embodiments, the rotary stage, protractor, or the like, includes a motor and is usable as a precision actuator. In accordance with a further aspect of the invention, in various embodiments, the precision actuator includes an absolute rotary scale and an absolute fiber-optic readhead or an absolute portion of a fiber-optic readhead that provides an absolute measurement signal based on the absolute rotary scale. In accordance with a further aspect of the invention, in various embodiments, the motorized rotary stage, protractor, or the like, also includes a periodic rotary scale and a complementary fiber-optic readhead, and the absolute measurement signal is combined with a signal derived from the periodic rotary scale to provide an absolute positioning measurement signal for the motorized rotary stage, protractor, or the like. In accordance with another aspect of the invention, in various embodiments, the motorized micrometer or micrometer head includes an interferometric-type fiber-optic readhead.

In accordance with one aspect of the invention, the gauge is a lever gauge. In accordance with a further aspect of the invention, the lever gauge has at least one of a height and width dimension that is less than at least one of 20, 15, 10, and 7 millimeters. In accordance with a further aspect of the invention, in various embodiments, the lever gauge has a height and width dimension that are both less than at least one of 20, 15, 10, and 7 millimeters. In accordance with another aspect of the invention, in various embodiments, the lever gauge provides a measuring resolution less than or equal to at least one of 50, 20, or 10 nanometers. In accordance with another aspect of the invention, in various embodiments, the lever gauge includes an interferometric-type fiber-optic readhead.

In accordance with one aspect of the invention, the gauge is a linear gauge. In accordance with a further aspect of the invention, the linear gauge has at least one of a maximum height, maximum width, and nominal barrel diameter dimension that is less than at least one of 10, 7.5, and 5.0 millimeters. In accordance with another aspect of the invention, in various embodiments, the linear gauge provides a measuring resolution less than or equal to one of 50, 20, or 10 nanometers. In accordance with another aspect of the invention, in various embodiments, the linear gauge includes an interferometric-type fiber-optic readhead.

In accordance with one aspect of the invention, the gauge is a scanning probe usable on a coordinate measurement machine or the like. In accordance with another aspect of the invention, in various embodiments, the scanning probe provides a measuring resolution less than or equal to one of 50, 20, or 10 nanometers. In accordance with another aspect of the invention, in various embodiments, the scanning probe includes an interferometric-type fiber-optic readhead.

In accordance with a separate aspect of the invention, the readhead is included within, or assembled within, an element that can be rotationally aligned about an axis parallel to the nominal readhead fiber axis within a hole in an element of the gauge, and locked in place in relation to the hole, at a desired alignment. In accordance with a further aspect of the invention, in various embodiments, the locking is accomplished by at least one of a clamp, a set screw, and an adhesive. In accordance with a further aspect of the invention, in various embodiments, the element that can be rotationally aligned includes a feature that mates with a rotational alignment feature surrounding or in the hole to determine the desired alignment. In accordance with a further aspect of the invention, in one embodiment, the feature is a v-groove that mates with one of a set screw and keying feature. In accordance with a further aspect of the invention, in one embodiment, the feature is a keying feature that mates with a groove in the hole. In accordance with another aspect of the invention, in one embodiment, the hole includes features aligned parallel to the axis of the hole, wherein the features are usable to align the element that includes the readhead precisely parallel to the axis of the hole.

In accordance with a separate aspect of the invention, the readhead is included, or assembled, within an element that fits within a hole in an element of the gauge, and the readhead includes a feature that engages with a feature in or around the hole to determine the nominal gap of the readhead relative to the scale grating internal to the gauge.

Hence, the invention overcomes the disadvantages of prior art precision measuring gauges and provides new application possibilities with an ultra-compact, highly accurate, economical, and high speed configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 16A, 16B and 16C are three isometric views that show various aspects of a miniature rotary table according to this invention;

FIG. 18 shows a standard polarization maintaining fiber-optic connector including a ferrule, wherein a fiber-optic readhead according to this invention can be substituted for the ferrule in the connector; and FIG. 19 shows a portion of one exemplary fiber-optic gauge configuration wherein a fiber-optic readhead is included in the fiber-optic connector of FIG. 18 and interchangeably assembled into the fiber-optic gauge by means of the fiber-optic connector.

DETAILED DESCRIPTION OF THE PREFERRED EMBODIMENT

Figure 1:
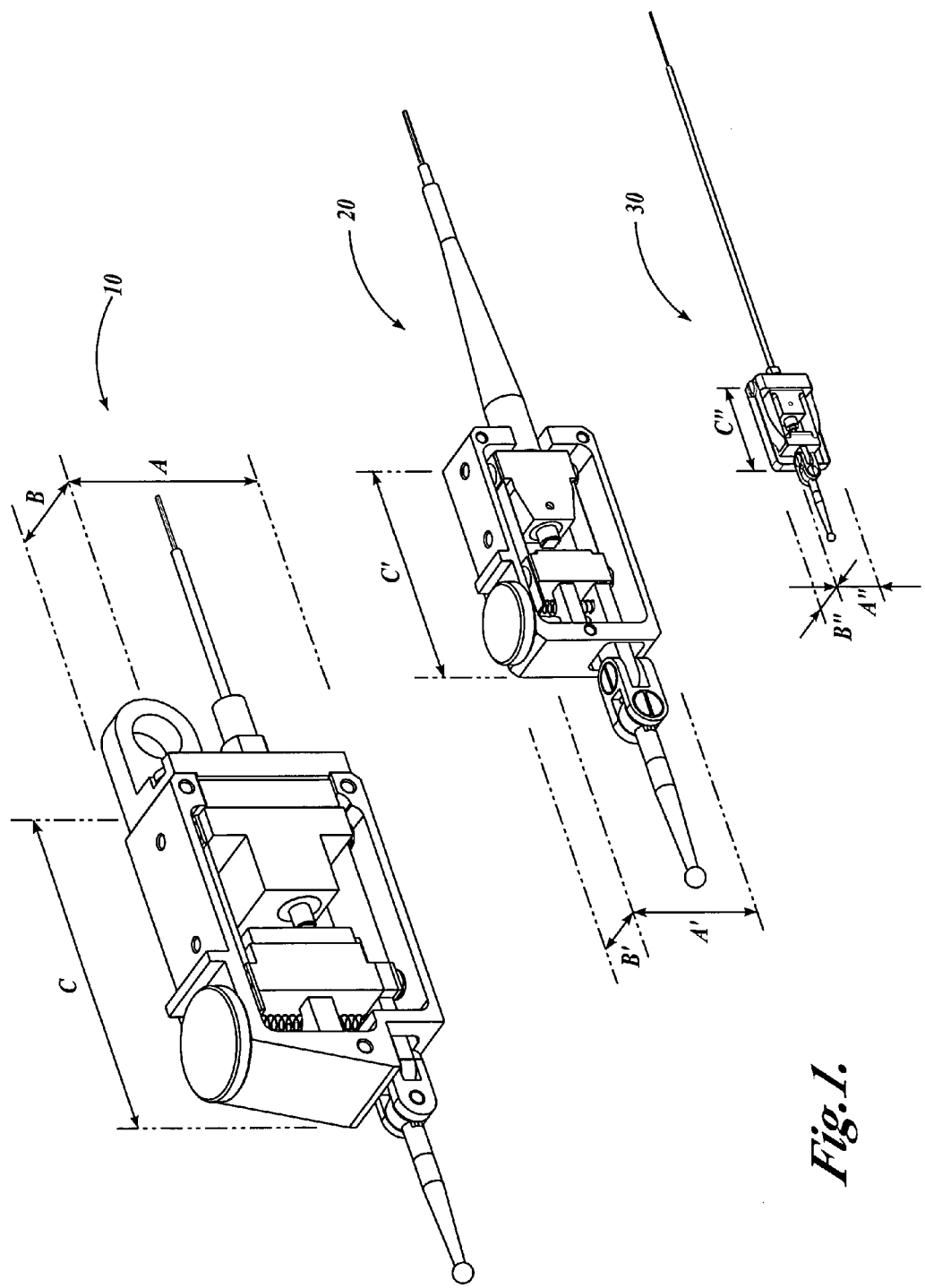
FIG. 1 is an isometric view showing first, second, and third embodiments of a fiber-optic lever gauge according to this invention.

FIG. 1 is an isometric view showing a first larger-sized generic embodiment of a fiber-optic lever gauge 10 according to this invention, a second medium-sized generic embodiment of a fiber-optic lever gauge 20 according to this invention, and a third smaller-sized generic embodiment of a fiber-optic lever gauge 30 according to this invention. Analogous elements numbered 1XX, 2XX, and 3XX in FIGS. 1–8 provide similar or identical functions, unless otherwise indicated by description or context. Therefore, only the differences between similarly numbered elements are described after any initial description of one of the similarly numbered elements. The fiber-optic lever gauges 10, 20 and 30 are shown approximately very roughly to scale relative to each other in FIG. 1, to emphasize with regard to the fiber-optic lever gauge 10 that a fiber-optic lever gauge according to this invention can be constructed in a conventional size; and with regard to the fiber-optic lever gauge 20 that a fiber-optic lever gauge according to this invention can be constructed in a reduced size; and with regard to the fiber-optic lever gauge 30 that a fiber-optic lever gauge according to this invention can be constructed in an unprecedented miniature size, which is enabled by the use of fiber-optic readhead according to this invention. The fiber-optic lever gauge 10 has a size and design comparable to commercially available lever gauges. The dimensions A, B, and C, of the fiber-optic lever gauge 10 may be on the order of 25 mm or less, 14 mm or less, and 50 mm or less, respectively. The fiber-optic lever gauge 20 includes components and assembly features comparable to the fiber-optic lever gauge 10. However, the dimensions A', B', and C', of the fiber-optic lever gauge 20 are significantly smaller than the comparable dimensions of the fiber-optic lever gauge 10, and may be approximately on the order of 14 mm or less, 8 mm or less, and 25 mm or less, respectively, for example. The miniature fiber-optic lever gauge 30 is designed to provide dimensions A", B", and C", that are significantly smaller than the comparable dimensions of the fiber-optic lever gauges 10 or 20, and that may be approximately on the order of 5–7 mm or less, 3.5–4 mm or less, and 11 mm or less, respectively, for example. These unprecedented miniature lever gauge dimensions are facilitated by the use of a fiber-optic readhead according to the principles of this invention, as described further below, with reference to FIGS. 7 and 8.

Figure 2:
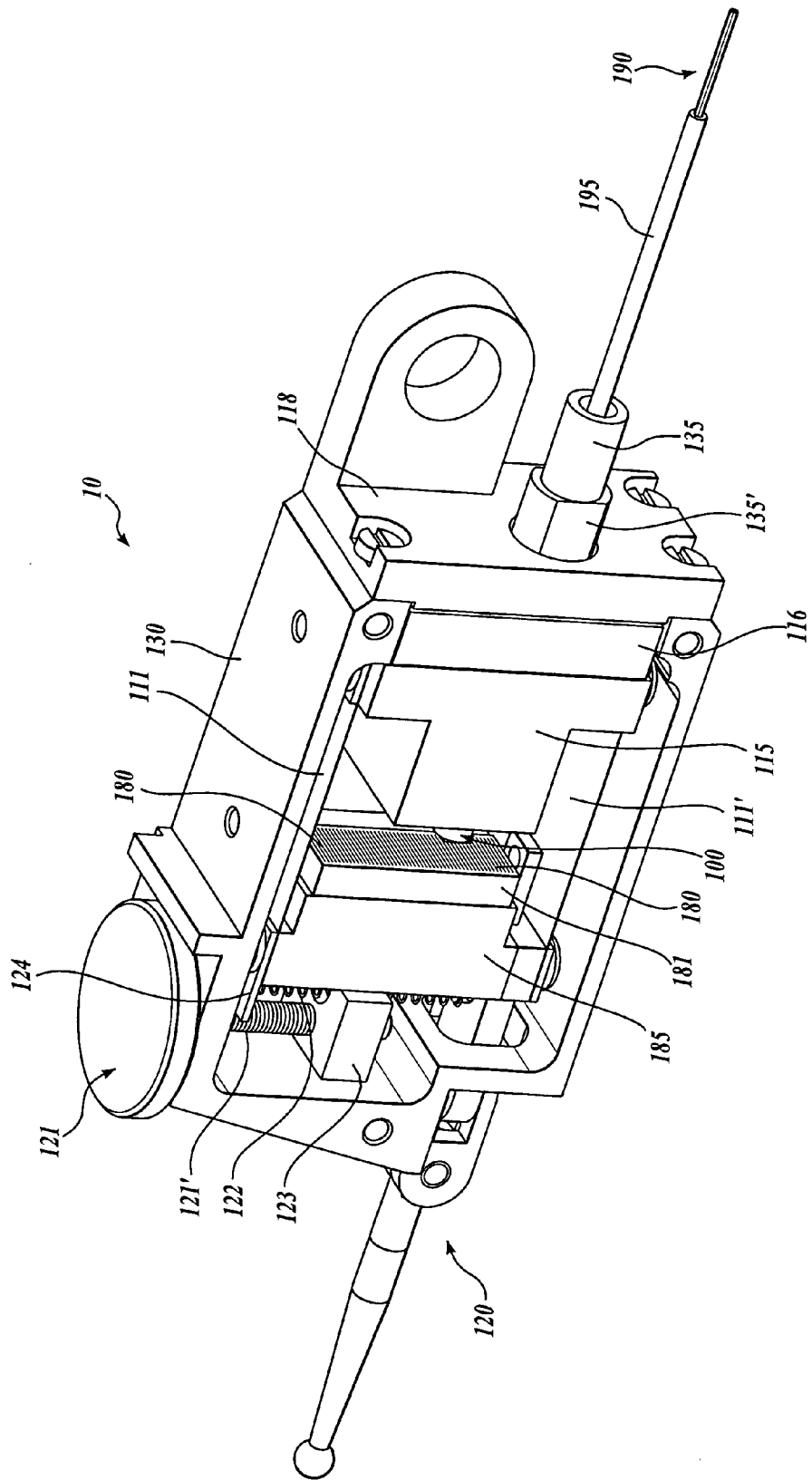
FIG. 2 is an isometric view showing the larger-sized first embodiment of a fiber-optic lever gauge according to this invention that is shown in FIG. 1.
Figure 3:
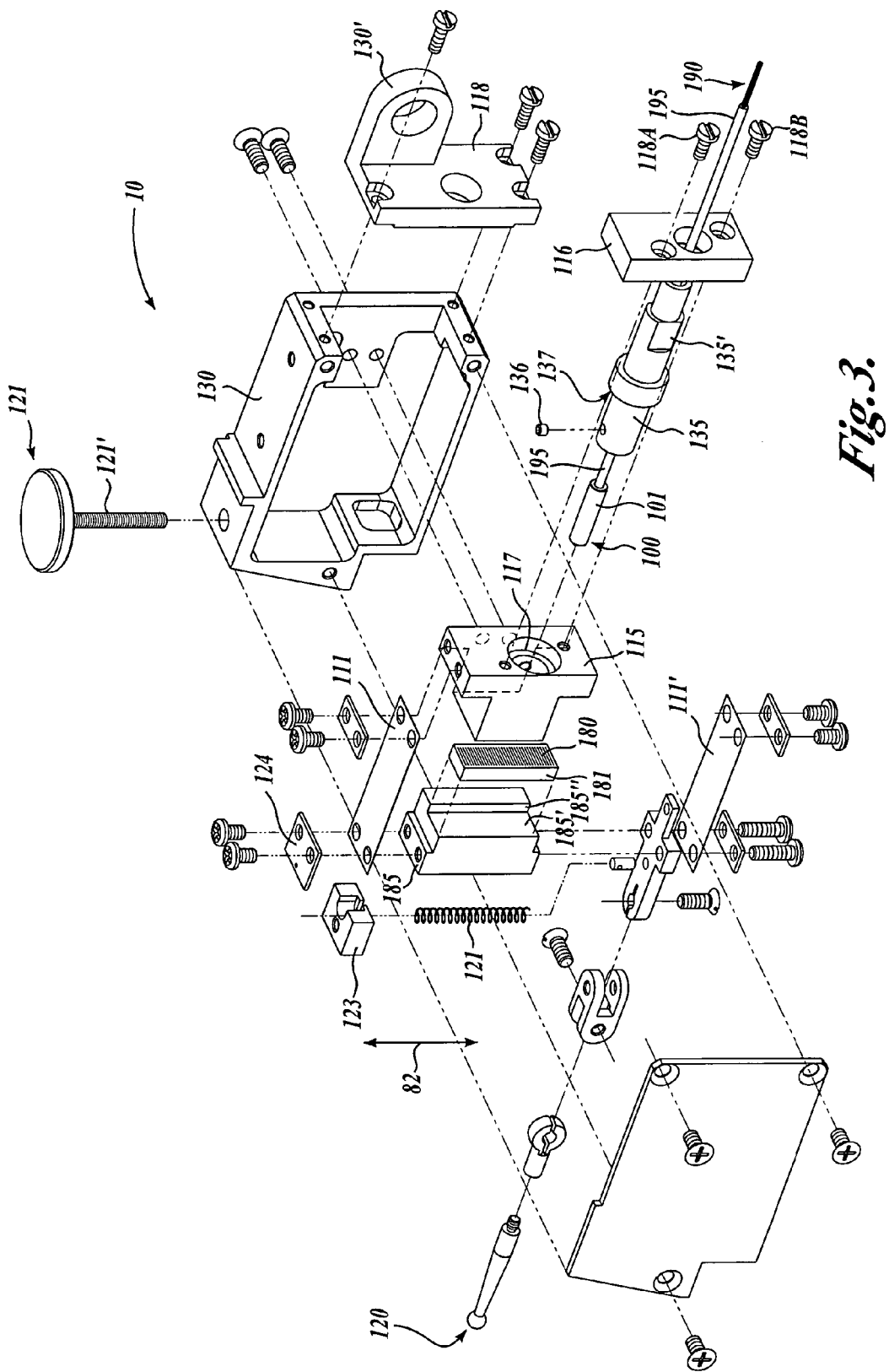
FIG. 3 is an exploded isometric view showing the larger-sized first embodiment of a fiber-optic lever gauge according to this invention that is shown in FIG. 2.
Figure 4:
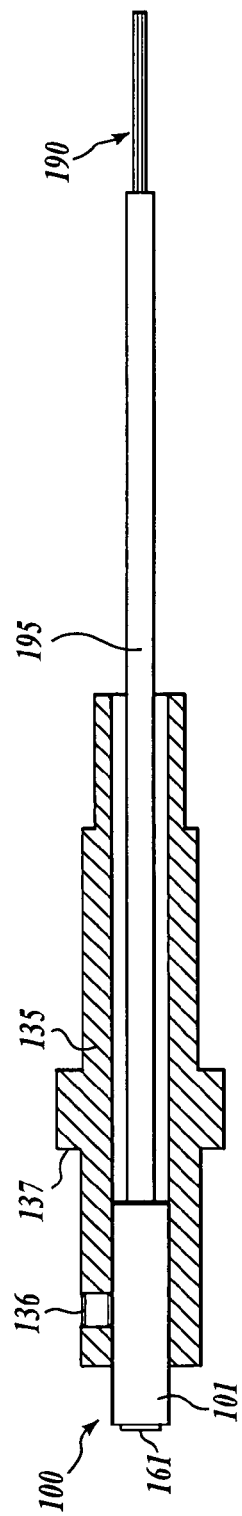
FIG. 4 is a side cross-sectional view showing a fiber-optic readhead according to this invention positioned inside a rotationally alignable member usable with the first embodiment of a fiber-optic lever gauge according to this invention.

FIG. 2 is an isometric view showing the larger-sized first generic embodiment of a fiber-optic lever gauge 10 according to this invention, in greater detail. The generic fiber-optic lever gauge 10 includes a fiber-optic readhead 100, described further below, which includes a phase mask 161 described further below, which is mounted to the end of a ferrule 101, and optical fibers 190 that are enclosed within the ferrule 101 and protected within a fiber-optic cable 195, all of which are mounted inside a rotationally alignable member 135 as best seen in FIGS. 3 and 4. It will be understood that the optical fibers 190 are routed to and from a remote optical interface and electronics circuit, such as one described further below. A rotationally alignable member 135 is mounted inside of a base member 115. Attached to the base member 115 are an upper flexure member 111 and a lower flexure member 111'. A forward mounting member 185 is attached to the flexures 111 and 111'. The forward mounting member 185 provides a mounting surface for a grating scale member 181. The grating scale member 181 includes a scale grating 180 not shown in FIG. 1, but which is best seen in FIGS. 2 and 3. The forward mounting member 185 also provides a mounting surface for a contact probe assembly 120. All of the foregoing is mounted to, and enclosed in, a housing/frame 130 described further below.

It should be appreciated that the generic fiber-optic lever gauge 10 uses the majority of mechanical parts from a conventional commercially available lever gauge, and the general operation of, and assembly of, any parts of the fiber-optic lever gauge 10 not described in detail here will be understood by reference to any of a variety of commercially available lever gauges, for example, the lever gauge model number "Mu-Checker" 519-326, available from Mitutoyo America Corporation, Aurora, Ill., USA, the product literature, manuals, and design and assembly of which is incorporated herein by reference in its entirety. Furthermore, it should thus be appreciated that a fiber-optic lever gauge according to this invention may be provided by retrofitting a conventional lever gauge with a fiber-optic readhead according to this invention, with minimal adaptation or alteration, and all of the previously described benefits of having all-optical output signals will be provided. However, it should be appreciated that the size benefits described below for reduced size lever gauge embodiments according to this invention will not be achieved for such retrofit embodiments.

With regard to the fiber-optic-readhead 100, in general, any of the fiber-optic readheads included in the incorporated '312, '619, '453, '238 and/or '508 Applications may be used in, or readily adapted to be used in, the last-described fiber fiber-optic gauge. The best, or adequate, selection among these various fiber-optic readheads for a particular application will be apparent to one of ordinary skill in the art, having benefit of the disclosure of those incorporated applications, in addition to the disclosure herein. In various exemplary embodiments of the last-described fiber fiber-optic gauge, an interferometric-type fiber-optic readhead, such as those disclosed in the '619 Application, will provide the most robust operating gap tolerances and the highest resolution and accuracy. In various other exemplary embodiments, a self imaging type fiber-optic readhead or an imaging type fiber-optic readhead, of the types shown in the '312 and '453 Application, respectively, may be used. In various other exemplary embodiments, an absolute type fiber-optic readhead of a type shown in, or derived from, the '238 Application, may be used. It should be appreciated that an absolute type fiber-optic readhead according to this invention may incorporate an interferometric-type fiber-optic readhead portion similar to one shown in the '619 Application, as the finest or highest resolution scale or track used in the absolute type fiber-optic readhead according to this invention. In any case, it should be understood that the various fiber-optic readhead and scale grating constructions, mounting and alignment and gap dimensions and specifications should be implemented in a fiber-optic gauge according to this invention in the same manner as described for the basic fiber-optic readhead fabrication, mounting and alignment as described in the incorporated Application that corresponds to the fiber-optic readhead that is used in a particular fiber-optic gauge according to this invention. In various exemplary embodiments, the ferrule 101 of the fiber-optic readhead 100 that is included in the fiber-optic lever gauge 10 has a diameter of 5 mm, 3 mm, or even 2 millimeters or less.

As shown in FIG. 2, the scale grating 180 is carried on a surface of the scale grating member 181. When the fiber-optic readhead 100 is an interferometric-type readhead, in various exemplary embodiments, the scale grating 180 may be a phase type grating, and may have a scale grating pitch on the order of 4 to 8 microns, for example, although these scale grating pitches are exemplary only and not limiting. According to the teachings in the '619 Application, with a fiber-optic readhead 100 and a scale grating 180 approximately as described here, the fiber-optic lever gauge 10 can provide a measuring resolution on the order of 10 nm or less. FIG. 2 also shows a conventional lever gauge biasing adjustment system comprising an adjustment knob 121 having a threaded stem portion 121', that is threaded into a biasing block 123, which engages a biasing spring 122. Depending on the adjustment of the biasing adjustment system, the biasing spring 122 either pushes down on a member attached to the probe assembly 120 and the forward mounting member 185, or up on a plate 124 attached to the forward mounting member 185, in order to compensate for the effects of gravity when the fiber-optic lever gauge 10 is used in various orientations.

FIG. 3 is an exploded isometric view showing the various parts of the larger-sized first generic embodiment of a fiber-optic lever gauge 10 according to this invention, in greater detail. The function and assembly of the various parts will be apparent to one of ordinary skill in the art and therefore need not be described in detail here. However, certain important aspects will be described or clarified.

The scale grating member 181 including the scale grating 180 is mounted and aligned against the alignment surfaces 185' and 185" in order to establish the proper alignment of the scale grating 180 with respect to a measuring axis 82 of the fiber-optic lever gauge 10. It should be appreciated that the forward mounting member 185 is, in turn, aligned by careful alignment and attachment of all of the connected members: the forward mounting member 185, upper fixture member 111, lower fixture member 111', base member 115, back plate 116, back cover 130', and housing/frame130, using the associated fasteners and fastener plates shown throughout FIG. 3.

Regarding the rotationally alignable member 135 as shown in FIG. 3, in one exemplary assembly and alignment method the fiber-optic cable 195 and the ferrule 101 of the fiber-optic readhead 100 are inserted into the rotationally alignable member 135, and as best shown in FIG. 4, the fiber-optic readhead 100 is positioned along the axis of the rotationally alignable member 135 at a desired dimension relative to a positioning surface 137 of that rotationally alignable member 135, and finally secured by a set screw 136. If desired, the fiber-optic readhead 100 may be approximately rotationally aligned about the axis of the rotationally alignable member 135 prior to being secured. The rotationally alignable member 135 is then positioned against the base member 115 such that the positioning surface 137 abuts the positioning surface 117 of the base member 115. When the fiber-optic lever gauge 10 is assembled, this abutting relationship establishes the gap between the fiber-optic readhead 100 and the scale grating 180 at the desired dimension.

During assembly, the rotationally alignable member 135, and in particular its flat surfaces 135', extend through the rear of the back plate 116 (and when further assembled, through the rear of the back cover 130'). When the fastening screws 118A and 118B are snugged but not tightened, the flat surfaces 135' can be engaged with a wrench to actively rotationally align the rotationally alignable member 135 while observing measuring signals output on the optical fibers 190 in order to provide the best rotational or yaw alignment of the fiber-optic readhead 100 relative to the scale grating 180. The scale grating 180 is displaced along the measuring axis 82 during this procedure in order to provide measuring signals on the optical fibers 190 that can be used to form a lissajous pattern that can be observed and used as a basis for rotationally aligning the rotationally alignable member 135 and the fiber-optic readhead 100, according to calibration and alignment principles well-known in the field of optical encoders. Finally, the fastening screws 118A and 118B are tightened to maintain the desired rotational alignment, as well as the abutting relationship between the positioning surfaces 117 and 137.

FIG. 4 is a side cross-sectional view showing the fiber-optic readhead 100 including a phase mask 161 positioned in a desired relationship along the axis of the fiber-optic readhead 100, and the rotationally alignable member 135, which are secured together by the set screw 136. It can be seen that the rotationally alignable member 135 provides some strain relief protection for the fiber-optic cable 195. That is, the internal joint between the ferrule 101 of the readhead 100 and the fiber-optic cable 195 is protected from bending, by the extension of the rotationally alignable member 135 along the axis of the fiber-optic cable 195. Alternatively, any other now-known or later-developed strain relief method may also be used to further protect the fiber-optic cable 195 when it is assembled to the fiber-optic lever gauge 10.

Figure 5:
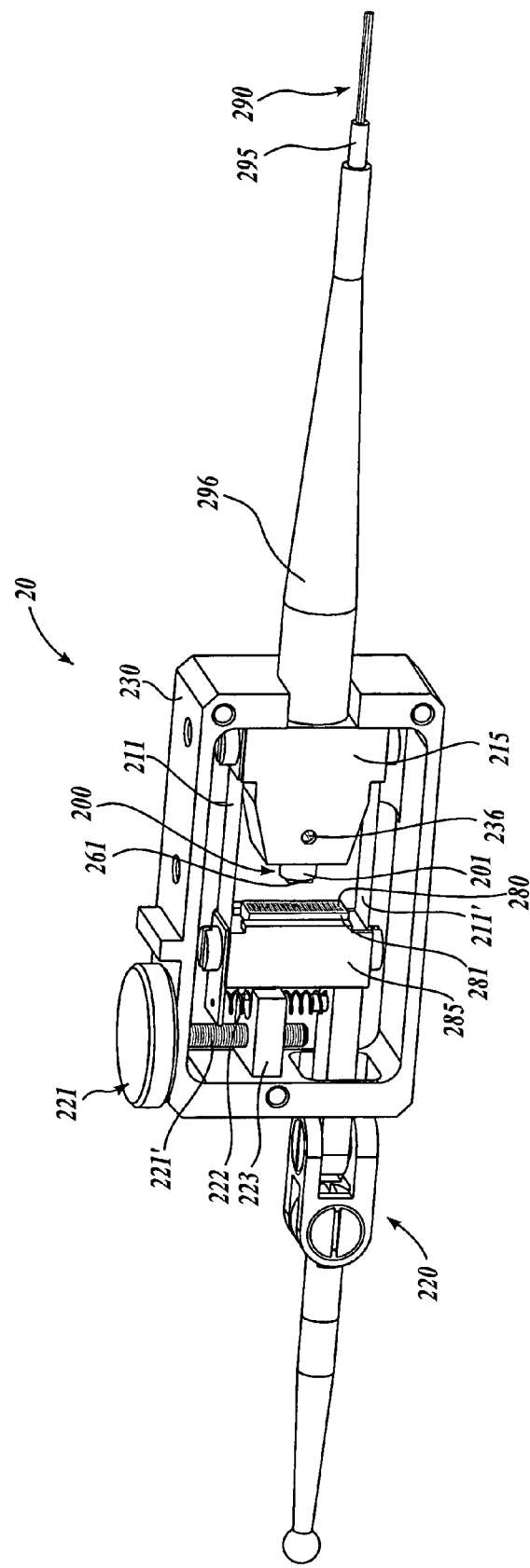
FIG. 5 is an isometric view showing the medium-sized second embodiment of a fiber-optic lever gauge according to this invention that is shown in FIG. 1.

FIG. 5 is an isometric view showing the second medium-sized generic embodiment of a fiber-optic lever gauge 20 according to this invention, which is also shown in FIG. 1. The fiber-optic lever gauge 20 according to this invention takes advantage of the miniature size of the included fiber-optic readhead 200 according to this invention, in order to provide a lever gauge that provides unprecedented reduced size benefits, as well as the benefits of the all-optical output measurement signals previously described. In various exemplary embodiments, the ferrule 201 of the fiber-optic readhead 200 that is included in the fiber-optic lever gauge 20 has a diameter of 4 mm, 3 mm, or even 2 mm or less. In various exemplary embodiments, the fiber-optic lever gauge 20 has a height dimension of approximately 14 mm or even less, and a thickness (width) dimension of approximately 8 mm or less, as previously described. As previously mentioned, analogous elements numbered 1XX, 2XX, and 3XX in FIGS. 1–8 provide similar or identical functions, unless otherwise indicated by description or context. Therefore, only the significant differences compared to similarly numbered elements previously described with reference to the fiber-optic readhead 10 shown in FIGS. 1–4 are described with reference to FIGS. 5 and 6 below.

Figure 6:
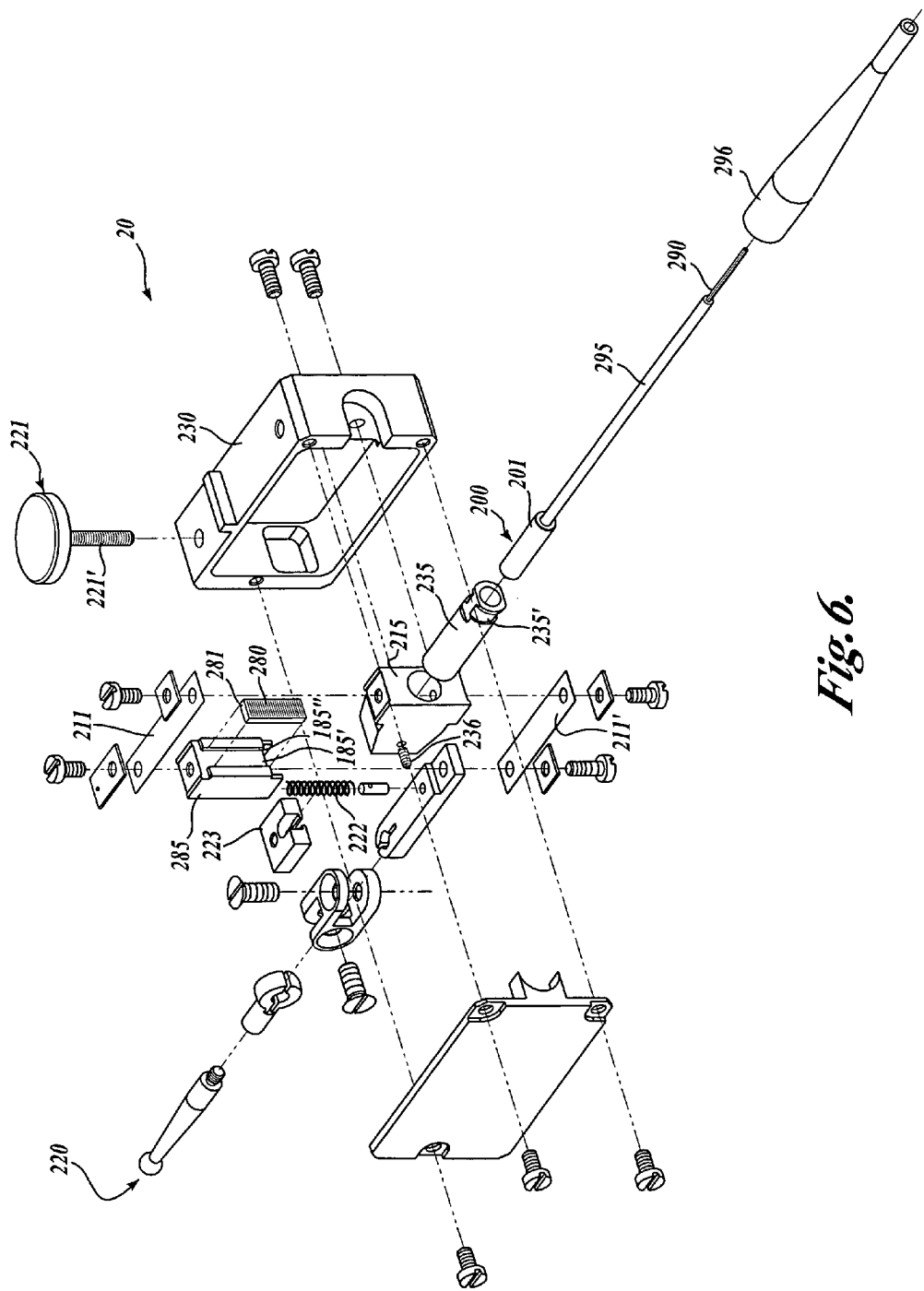
FIG. 6 is an exploded isometric view showing the medium-sized second embodiment of a fiber-optic lever gauge according to this invention that is shown in FIG. 5.

As shown in FIGS. 5 and 6, a few of the minor differences between the generic fiber-optic lever gauges 10 and 20 include that the base element 215 of the lever gauge 20 combines all of the functions of the elements 115 and 116 of the lever gauge 10. Furthermore, the functions of the elements 130 and 130' of the lever gauge 10 are combined in the functions of the housing/frame 230 of the lever gauge 20. The fiber-optic readhead 200 is inserted into the rotationally alignable member 235 and positioned along the axis of the rotationally alignable member 235, as previously described for the fiber-optic readhead 100 and the rotationally alignable member 135. The two elements may then be fixed together using adhesive or a set screw (not shown). Then, the rotationally alignable member 235 is simply inserted into the base member 215 to a desired depth, using a gauge, fixture, or the like, and secured by the set screw 236 in order to set the gap between the fiber-optic readhead 200 and the scale grating 280 when the lever gauge 20 is assembled. When the fiber-optic lever gauge 20 is assembled, the set screw 236 may be snugged, not tightened, and the rotationally alignable member 235 may be actively rotationally aligned as previously described for the rotationally alignable member 135. The set screw 236 may then be tightened to secure the desired rotational (yaw) alignment of the fiber-optic readhead 200 relative to the scale grating 280. The fiber-optic readhead 200 and accompanying scale grating 280 may be of any operable type disclosed in one of the incorporated '619, '312, '453, or '238 Applications. For example, when the fiber-optic readhead 200 is an interferometric-type readhead, the fiber-optic readhead 200, the scale grating 280, and the related operating gap, may be designed and assembled according to the teachings in the '619 Application, and the fiber-optic lever gauge 20 can provide a measuring resolution on the order of 10 nm, or less, if desired.

The fiber-optic lever gauge 20 also includes a strain relief boot 296, which is secured in, and against, a groove 235' at the rear of the rotationally alignable member 235, when the fiber-optic lever gauge 20 is fully assembled. As previously described, such strain relief protects against bending and straining between the fiber-optic readhead 200 and the fiber-optic cable 295 at the rear of the ferrule 201.

Figure 7:
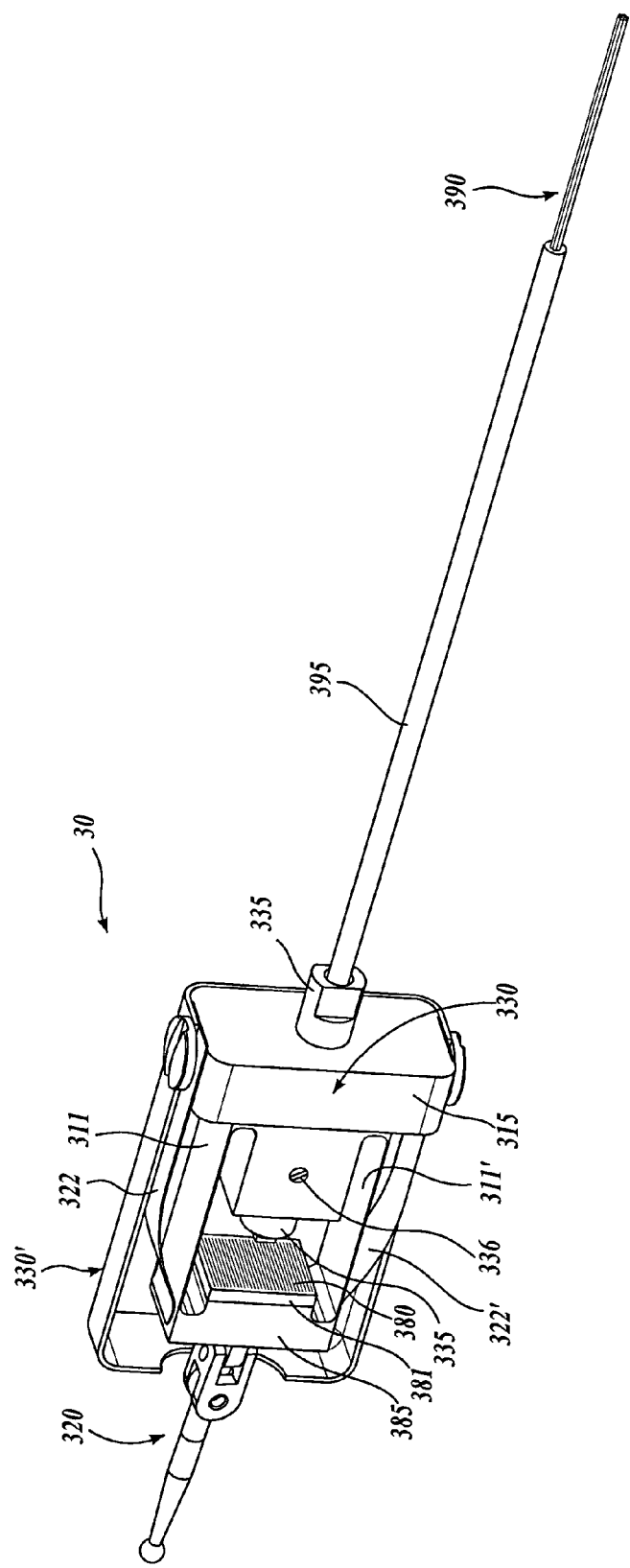
FIG. 7 is an isometric view showing the smaller-sized third embodiment of a fiber-optic lever gauge according to this invention that is shown in FIG. 1.
Figure 8:
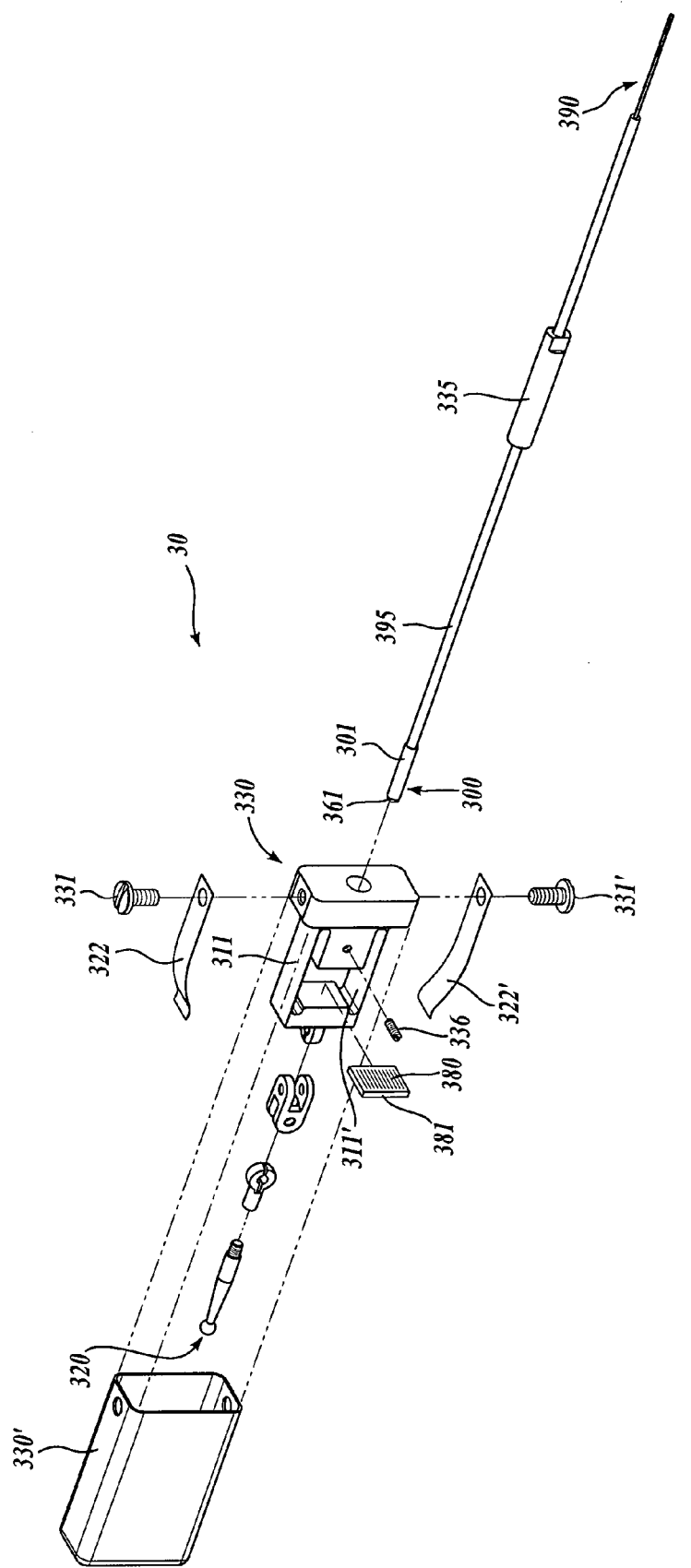
FIG. 8 is an exploded isometric view showing the smaller-sized third embodiment of a fiber-optic lever gauge according to this invention that is shown in FIG. 7.

FIGS. 7 and 8 are isometric views showing the third smaller-sized generic embodiment of a fiber-optic lever gauge 30 according to this invention, which is also shown in FIG. 1. The fiber-optic lever gauge 30 according to this invention takes advantage of the miniature size of the included fiber-optic readhead 300 according to this invention, in order to provide a lever gauge that provides completely unprecedented reduced size benefits, as well as the benefits of the all-optical output measurement signals previously described. In various exemplary embodiments, the ferrule 301 of the fiber-optic readhead 300 that is included in the fiber-optic lever gauge 30 has a diameter of 3 mm, 2 mm, or even 1 mm or less. In various exemplary embodiments, the fiber-optic lever gauge 30 has a height dimension of approximately 7 mm or even less, and a thickness dimension of approximately 4 mm or less. As previously mentioned, analogous elements numbered 1XX, 2XX, and 3XX in FIGS. 1–8 provide similar or identical functions, unless otherwise indicated by description or context. Therefore, only the significant differences compared to similarly numbered elements previously described with reference to the fiber-optic readhead 10 shown in FIGS. 1–4, and the fiber-optic readhead 20 shown in FIGS. 5 and 6, are described with reference to FIGS. 7 and 8 below.

As shown in FIGS. 7 and 8, a few of the minor differences between the generic fiber-optic lever gauges 20 and 30 include that the base/frame/flexure element 330, best seen in FIG. 8, combines all of the functions of the elements 215, 230, and the flexures 211 and 211' of the lever gauge 20, as provided by the base portion 315, the flexure portions 311 and 311', and the forward mounting portion 385 of the base/frame/flexure element 330. The base/frame/flexure element 330 may be fabricated with a combination of conventional machining, and EDM machining to form the flexures, for example.

Another difference is that the coil spring bias system used in the readheads 10 and 20 is replaced by a leaf spring bias system comprising an upper spring 322 and a lower spring 322', which are secured to the base/frame/flexure element 330 by the screws 331 and 331', as the cover 330' is installed over the other elements sub-assembled to the base/frame/flexure element 330. In various exemplary embodiments, the leaf spring bias system of the fiber-optic readhead 30 is adjusted by the initial design of the leaf springs 322 and 322'. In various other exemplary embodiments, the cover 330' may include a threaded hole or holes, and a small biasing screw or screws (not shown) that can impinge upon the leaf springs 322 and 322' may be used in order to adjust the bias of the lever gauge to compensate for the effects of gravity.

The assembly and rotational alignment of the rotationally alignable member 335 and the fiber-optic readhead 300 may be provided as previously described for the comparable members of the fiber-optic lever gauge 20. The set screw 336 may then be tightened to secure the desired rotational (yaw) alignment of the fiber-optic readhead 300 relative to the scale grating 380.

It should be appreciated that the fiber-optic lever gauge 30 may be even further miniaturized in various other embodiments according to this invention. For example, the rotationally alignable member 335 may be omitted and a ferrule 301 having a diameter of 2 mm, 1 mm, or even less, may be mounted directly into an even smaller base/frame/flexure element 330. In this manner, a height dimension of approximately 5 mm or less, and a width dimension of approximately 3.5 mm or less, is provided in various exemplary lever gauge embodiments according to this invention.

It will be appreciated by one skilled in the art, having benefit of this disclosure, that with little or no modification any of the fiber-optic lever gauges 10, 20, and 30 described above, may be mounted to a coordinate measuring machine (CMM) and used as a one-dimensional scanning probe, that is, as an analog output type probe or sensor that outputs a measurement value that is continuously proportional to the relative deflection between the contact probe tip and the body of the probe or sensor. The CMM, or a host computer, can merge the measurements of the coordinate measuring machine and the scanning probe according to known methods, to provide a high resolution composite measurement of a workpiece surface position relative to the CMM coordinate frame.

Furthermore, it will also be appreciated by one skilled in the art, having benefit of this disclosure, that the parallel-spring type suspension used in association with the fiber-optic readheads and corresponding scales in the fiber-optic lever gauges 10, 20 and 30 is similar to parallel-spring type suspensions used in known three-dimensional analog CMM probes, such as, for example, that shown in U.S. Pat. No. 5,390,424 to Butter, which is incorporated herein in by reference in its entirety. Thus, it will be appreciated that known three-dimensional analog CMM probes can readily incorporate various types of redheads and scales disclosed in the incorporated '619, '312, '453, '238, or '508 Applications, to provide a three-dimensional scanning probe according to this invention that is usable on a coordinate measurement machine or the like. For example, one of ordinary skill in the art, having benefit of this disclosure, will readily understand that the readheads and scales disclosed in the incorporated '619, '312, '453, '238, or '508 Applications may be used with little or no modification in place of the readheads 62B, 64B and 66B, and scales 62A, 64A, and 66A, in the CMM probe described in the incorporated '424 Application. In accordance with previously disclosed measurement performance, such a scanning probe can provide a measuring resolution less than or equal to at least one of 50, 20, or 10 nanometers. In various embodiments, such a scanning probe can include one or more interferometric-type fiber-optic readheads and scales, such as those disclosed in the incorporated '619 Application.

Figure 9:
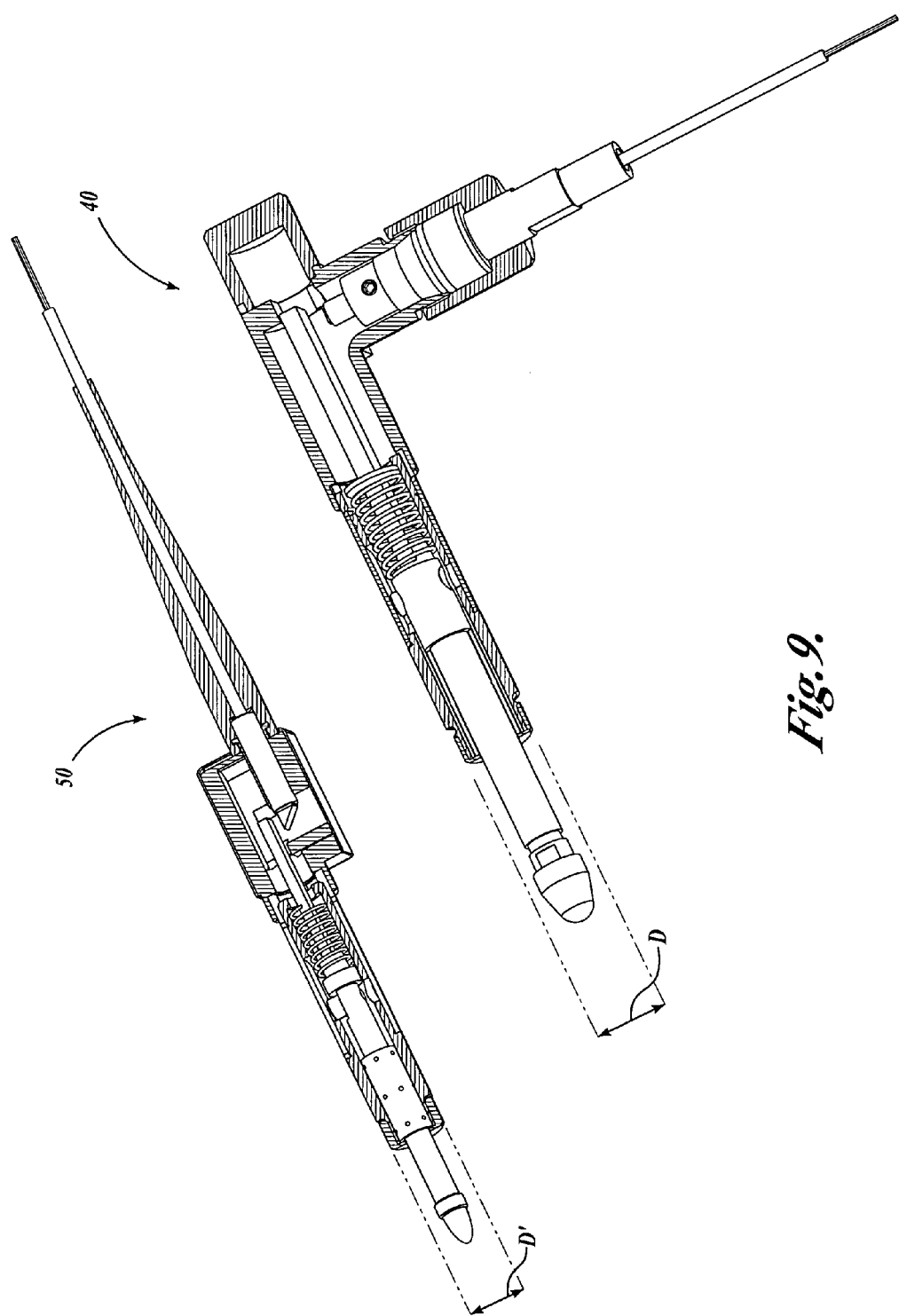
FIG. 9 is an isometric view showing a larger-sized first embodiment and smaller-sized second embodiment of a fiber-optic linear gauge according this invention.

FIG. 9 is an isometric, partially cross-sectional side view showing a first larger-sized generic embodiment of a fiber-optic linear gauge 40 according to this invention, and a second smaller-sized generic embodiment of a fiber-optic linear gauge 50 according to this invention. Analogous elements numbered 1XX–5XX in FIGS. 1–14 provide similar or identical functions, unless otherwise indicated by description or context. Therefore, only the differences between similarly numbered elements are described after any initial description of one of the similarly numbered elements. The fiber-optic linear gauges are shown very roughly to scale relative to each other in FIG. 9, to emphasize with regard to the fiber-optic linear gauge 40 that a fiber-optic linear gauge according to this invention can be constructed in a conventional size; and with regard to the fiber-optic linear gauge 50 that a fiber-optic linear gauge according to this invention can be constructed in a considerably reduced size, which is enabled by the use of a fiber-optic readhead according to this invention. The fiber-optic linear gauge 40 has a size and design comparable to commercially available linear gauges. The nominal housing diameter D of the fiber-optic linear gauge 40 may be on the order of 8 mm or less. The fiber-optic linear gauge 50 includes components and assembly features comparable to the fiber-optic linear gauge 40. However, the miniaturized fiber-optic linear gauge 50 has a nominal housing diameter D' that may be approximately on the order of 5 mm, 4 mm, or even less. The miniature dimensions of the fiber-optic linear gauge 50, as well as other desirable characteristics are facilitated by the use of a fiber-optic readhead according to the principles of this invention, as described further below, with reference to FIGS. 12–14.

FIG. 2 is an isometric view showing the larger-sized first generic embodiment of a fiber-optic linear gauge 40 according to this invention, in greater detail. The generic fiber-optic linear gauge 40 includes a fiber-optic readhead 400, described further below, which includes a phase mask 461 that is mounted to the end of a ferrule 401, and optical fibers 490 that are enclosed within the ferrule 401 and protected within a fiber-optic cable 495. The fiber-optic readhead 400 is mounted inside a rotationally alignable member 435. It will be understood that the optical fibers 490 are routed to and from a remote optical interface and electronics circuit, such as one described further below. The rotationally alignable member 435 is mounted inside of a housing portion 430', with the aid of a tapered member 435', described in greater detail below.

The fiber-optic linear gauge 40 further includes a spindle 420, a spindle/scale mounting member 420' having a scale mounting portion 420", a spindle stop screw 428, and a spindle return spring 431. The scale mounting portion 420" provides a mounting surface for a scale grating member 481, which is aligned in an appropriate fixture and secured by adhesive. The scale grating member 481 includes a scale grating 480. All of the foregoing is mounted and/or enclosed in various pieces of a housing/frame 430 as shown in FIGS.

10 and 11. A linear bearing 432 guides the spindle 420 and its attached elements, including the scale grating member 481, within the bore of the housing/frame 430. The spindle/scale mounting member 420' is joined to the spindle 420 by the spindle stop screw 428. When assembled, the spindle stop screw 428 slides within a slot 427' in a spindle stop member 427, in order to limit the travel of the spindle 420 and the attached scale grating member 481.

It should be appreciated that the generic fiber-optic linear gauge 40 uses the majority of mechanical parts from a conventional commercially available linear gauge, and the general operation of, and assembly of, any parts of the fiber-optic linear gauge 40 not described in detail here will be understood by reference to any of a variety of commercially available linear gauges, for example, the linear gauge model number "LGB series" 542-204, available from Mitutoyo America Corporation, Aurora, Ill., USA, the product literature, manuals, and design and assembly of which is incorporated herein by reference in its entirety.

Furthermore, it should thus be appreciated that a fiber-optic linear gauge according to this invention may be provided by retrofitting a conventional linear gauge with a fiber-optic readhead according to this invention, with minimal adaptation or alteration, and all of the previously described benefits of having all-optical output signals will be provided. However, it should be appreciated that the size benefits described below for reduced size linear gauge embodiments according to this invention will not be achieved for such retrofit embodiments.

With regard to the fiber-optic readhead 400, in general, any of the fiber-optic readheads included in the incorporated '312, '619, '453, '238 and/or '508 Applications may be used as, or readily adapted to be used as, the fiber-optic readhead 400 in a fiber-optic linear gauge according to this invention. The best, or adequate, selection among these various fiber-optic readheads for a particular application will be apparent to one of ordinary skill in the art, having the benefit of this disclosure and the incorporated applications. In various exemplary embodiments of the last-described fiber-optic linear gauge, an interferometric-type fiber-optic readhead, such as those disclosed in the '619 Application, will provide the most robust operating gap tolerances and the highest resolution and accuracy. When the fiber-optic readhead 400 is an interferometric-type readhead, in various exemplary embodiments, the scale grating 480 may be a phase type grating having a scale grating pitch on the order of 4 to 8 microns, for example, although these scale grating pitches are exemplary only and not limiting. According to the teachings in the '619 Application, with such an interferometric type fiber-optic readhead 400 and a corresponding scale grating 480, the fiber-optic linear gauge 40 can provide a measuring resolution on the order of 10 nm or less, if desired. In various other exemplary embodiments, a self-imaging type fiber-optic readhead or an imaging type fiber-optic readhead, of the types shown in the '312 and '453 Applications, respectively, may be used. In various other exemplary embodiments, an absolute type fiber-optic readhead of a type shown in, or derived from, the '238 Application may be used. It should be appreciated that an absolute type fiber-optic readhead according to this invention may incorporate an interferometric-type fiber-optic readhead portion similar to one shown in the '619 Application, as the finest or highest resolution scale or track used in the absolute type fiber-optic readhead according to this invention. In any case, it should be understood that the various fiber-optic readhead and scale grating constructions, mounting and alignment and gap dimensions and specifications should be implemented in a fiber-optic gauge according to this invention in the same manner as described for the basic fiber-optic readhead fabrication, mounting and alignment as described in the incorporated Application that corresponds to the fiber-optic readhead used in a particular fiber-optic gauge according to this invention. In various exemplary embodiments, the ferrule 401 of the fiber-optic readhead 400 that is included in the fiber-optic linear gauge 40 has a diameter of 5 mm, 3 mm, or even 2 mm or less.

Figure 10:
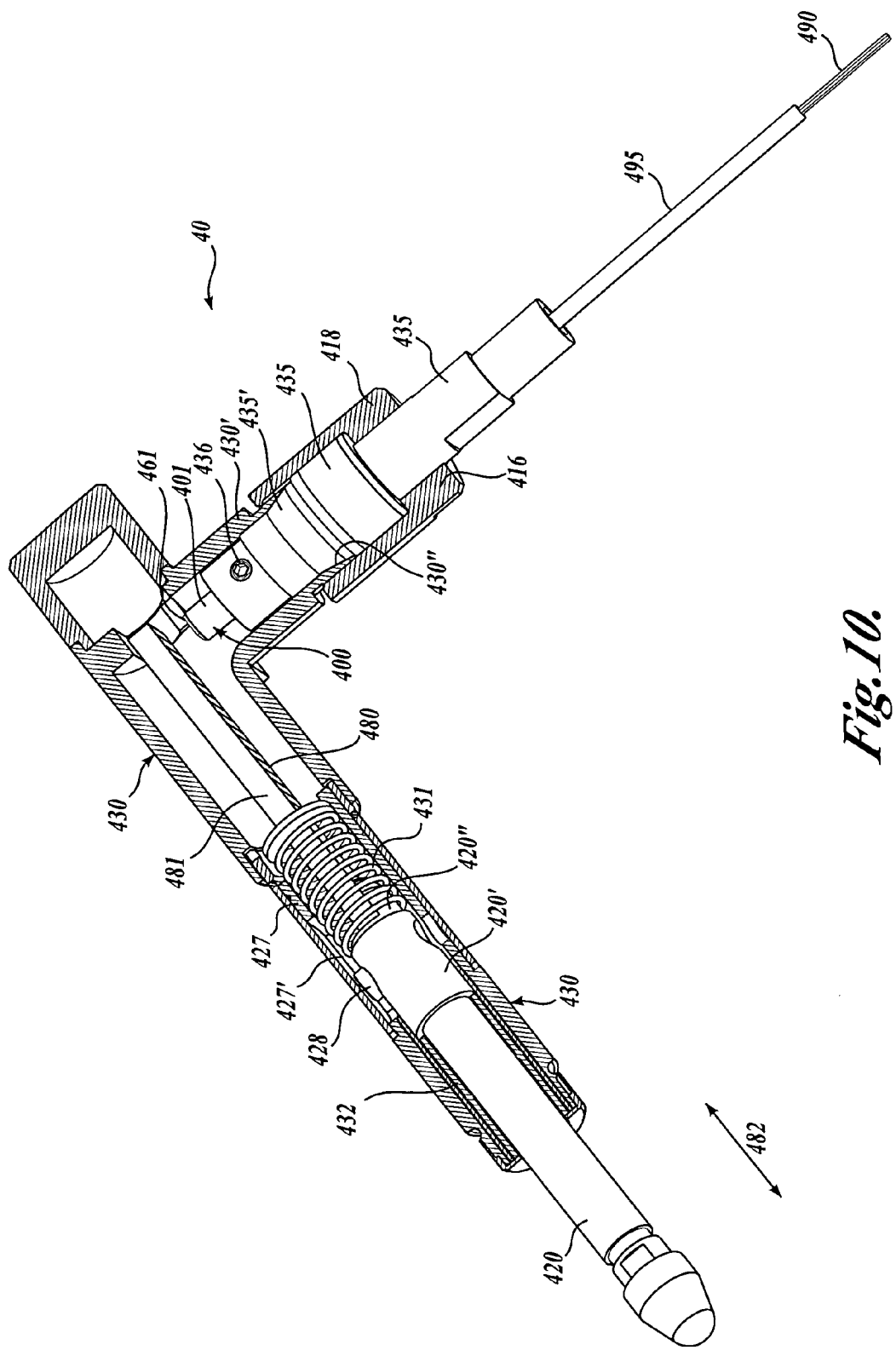
FIG. 10 is an isometric, partially cross-sectional view showing the larger-sized first embodiment of a fiber-optic linear gauge according to this invention that is shown in FIG. 9.
Figure 11:
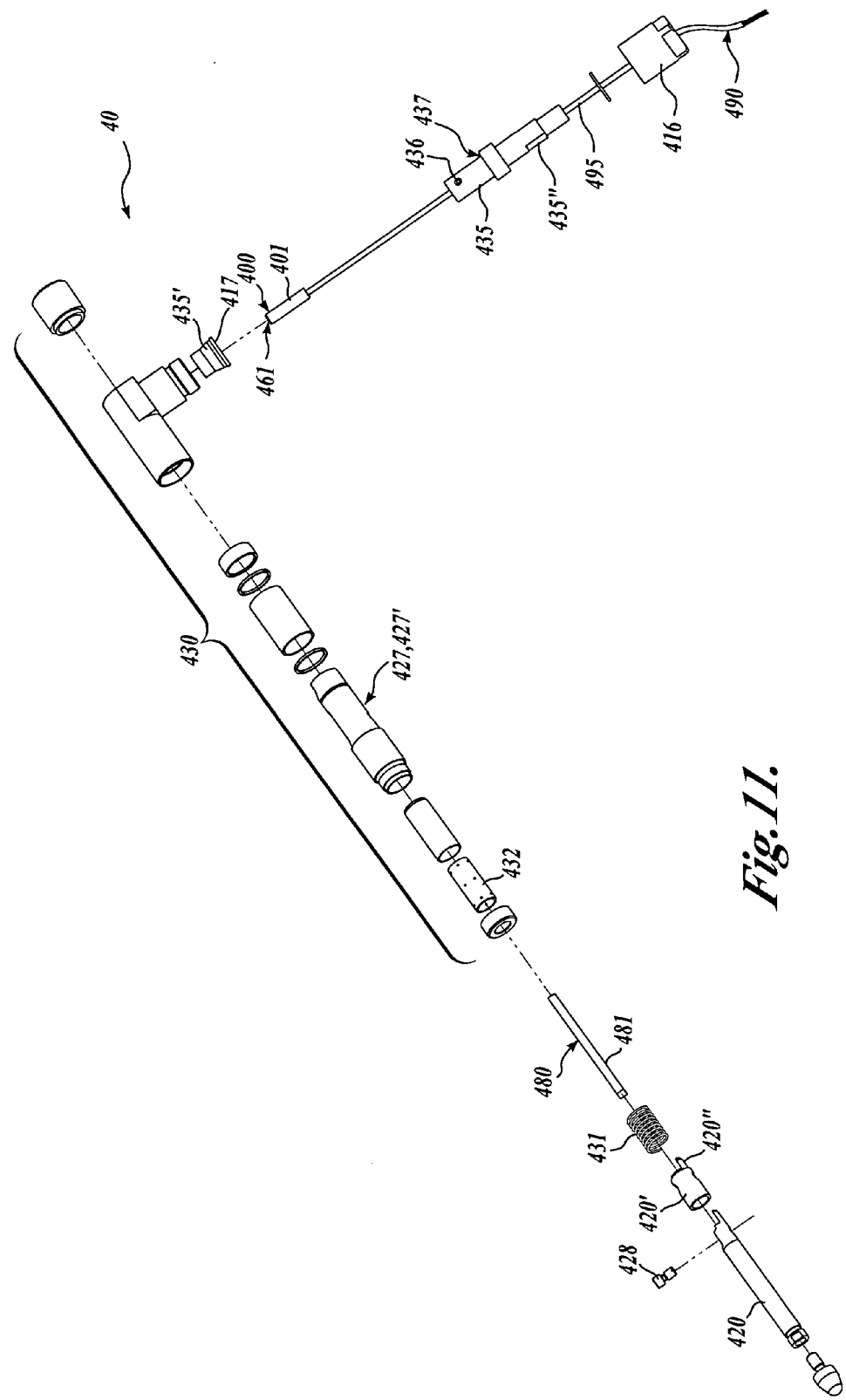
FIG. 11 is an exploded isometric view showing the larger-sized first embodiment of a fiber-optic linear gauge according to this invention that is shown in FIG. 10.

FIG. 11 is an isometric exploded view showing the larger-sized first generic embodiment of a fiber-optic linear gauge 40 according to this invention, in greater detail. The function and assembly of the various parts will be apparent to one of ordinary skill in the art and therefore need not be described in detail here. However, certain important aspects will be described or clarified. FIG. 11, together with FIG. 10, shows how a tapered member 435' abuts an internally tapered portion 430" of the housing portion 430' in order to center the rotationally alignable member 435, and by virtue of the abutting surfaces 417 and 437, shown in FIG. 11, to establish the proper gap between the readhead 400 and the scale grating 480 along the axial direction of the readhead 400 and the rotationally alignable element 435, approximately as previously described for the rotationally alignable element of 135 of the lever gauge 10.

Regarding the rotationally alignable member 435 as shown in FIGS. 10 and 11, in one exemplary assembly and alignment method the fiber-optic cable 495 and the ferrule 401 of the fiber-optic readhead 400 are inserted into the rotationally alignable member 435, and as best shown in FIG. 10, the fiber-optic readhead 400 is positioned along the axis of the rotationally alignable member 435 at a desired dimension relative to a positioning surface 437 of the rotationally alignable member 435, and finally secured by a set screw 436. If desired, the fiber-optic readhead 400 may be approximately rotationally aligned about the axis of the rotationally alignable member 435 prior to being secured. The rotationally alignable member 435 is then positioned against the tapered member 435' such that the positioning surface 437 abuts the positioning surface 417 of the tapered member 435'. When the fiber-optic linear gauge 40 is assembled, this abutting relationship establishes the gap between the fiber-optic readhead 400 and the scale grating 480 at the desired dimension.

During assembly, the rotationally alignable member 435, and in particular its flat surfaces 435", extends through the rear of the back cap 416. When the back cap 416 is snugged but not tightened, the flat surfaces 435" can be engaged with a wrench to actively rotationally align the rotationally alignable member 435 while observing measuring signals output on the optical fibers 490 in order to provide the best rotational or yaw alignment of the fiber-optic readhead 400 relative to the scale grating 480. The scale grating 480 is displaced along the measuring axis 482 during this procedure, in order to provide measuring signals on the optical fibers 490 that can be used to form a lissajous pattern that can be observed and used as a basis for rotationally aligning the rotationally alignable member 435 and the fiber-optic readhead 400, according to calibration and alignment principles well-known in the field of optical encoders. Finally, the back cap 416 is tightened to maintain the desired rotational alignment, as well as the abutting relationship between the surfaces 417 and 437. If desired, any now-known or later-developed strain relief method may also be added around the fiber-optic cable 495 and/or the adjacent portion of the rotationally alignable member 435 when it is assembled to the fiber-optic linear gauge 40.

Figure 12:
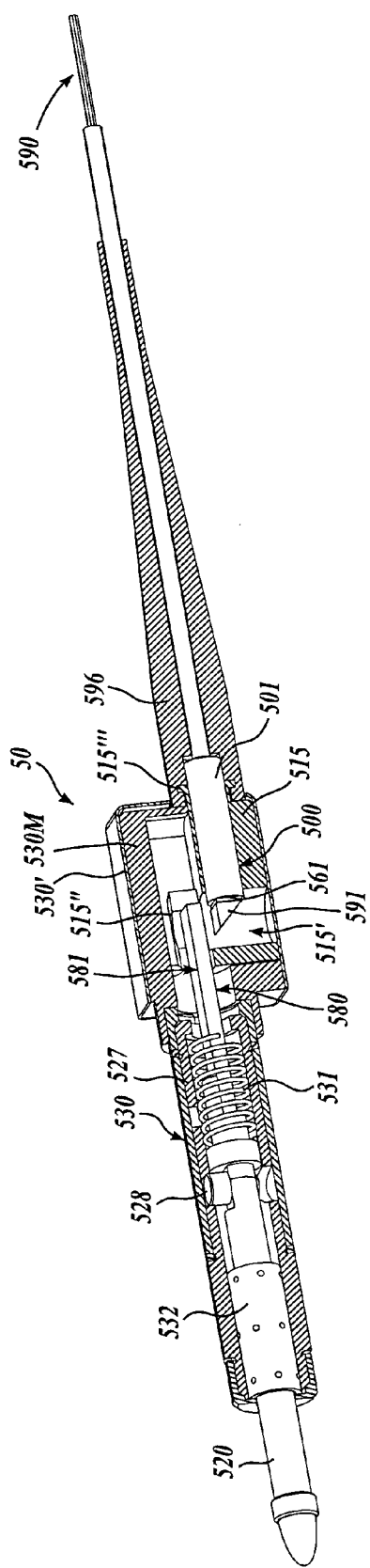
FIG. 12 is an isometric, partially cross-sectional view showing the smaller-sized second embodiment of a fiber-optic linear gauge according to this invention that is shown in FIG. 9.

FIG. 12 is an isometric, partially cross-sectional side view showing the second smaller-sized generic embodiment of a fiber-optic linear gauge 50 according to this invention, which is also shown in FIG. 9. The fiber-optic linear gauge 50 according to this invention takes advantage of the miniature size of the included fiber-optic readhead 500 according to this invention, in order to provide a linear gauge that provides unprecedented reduced size benefits, as well as the benefits of the all-optical output measurement signals previously described. In various exemplary embodiments, the ferrule 501 of the fiber-optic readhead 500 that is included in the fiber-optic linear gauge 50 has a diameter of 4 mm, 3 mm, 2 mm, or even 1 millimeter or less. In various exemplary embodiments, the fiber-optic linear gauge 50 has a spindle diameter of approximately 2 mm or even less, and a housing diameter of approximately 4 to 5 mm or less. As previously mentioned, analogous elements numbered 1XX–5XX in FIGS. 1–14 provide similar or identical functions, and particularly those analogous elements numbered 4XX–5XX in FIGS. 9–14, unless otherwise indicated by description or context. Therefore, only the significant differences compared to similarly numbered elements previously described with reference to the fiber-optic linear gauge 40 shown in FIGS. 9–11 are described with reference to FIGS. 12–14 below.

Figure 13:
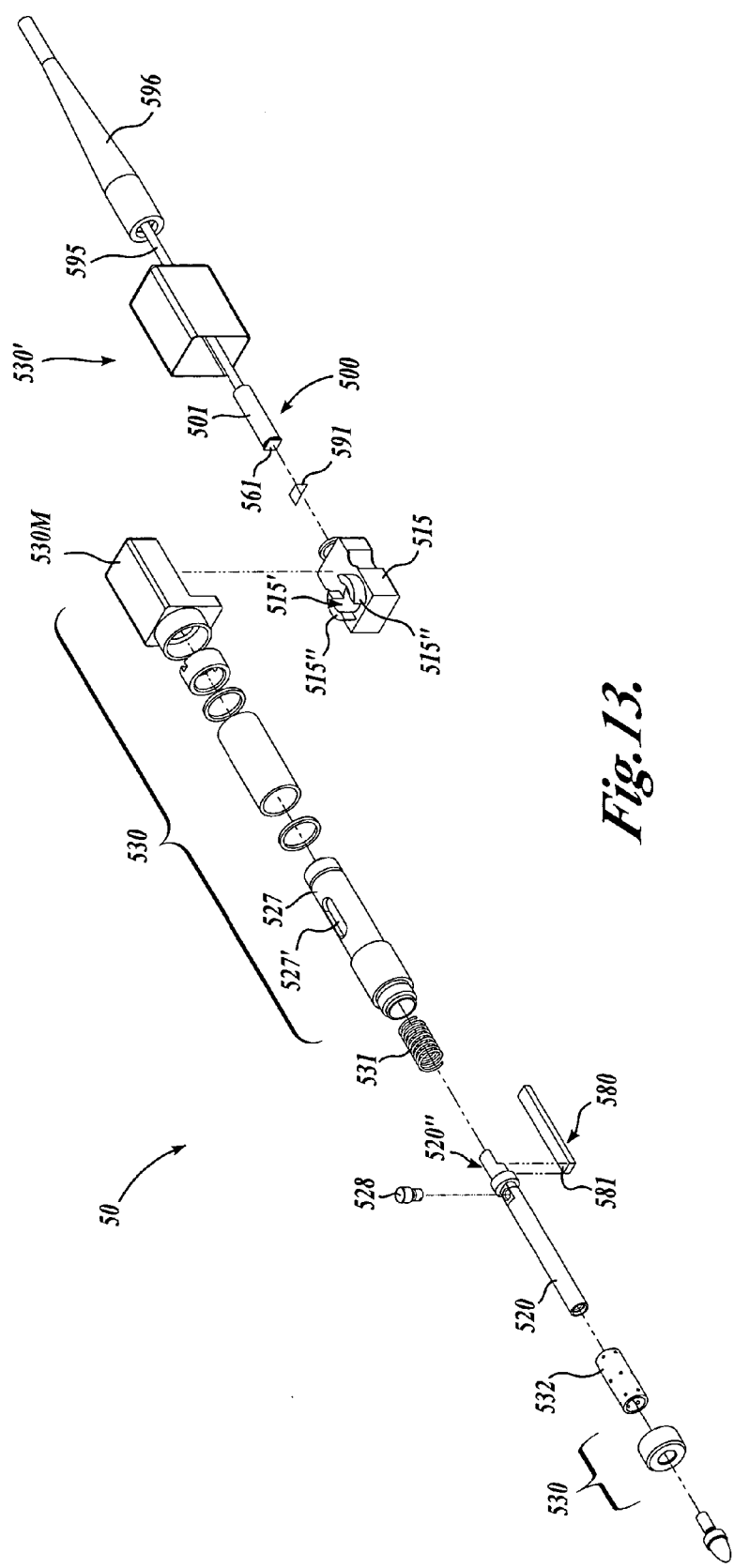
FIG. 13 is an exploded isometric view showing the smaller-sized second embodiment of a fiber-optic linear gauge according to this invention that is shown in FIG. 12.
Figure 14:
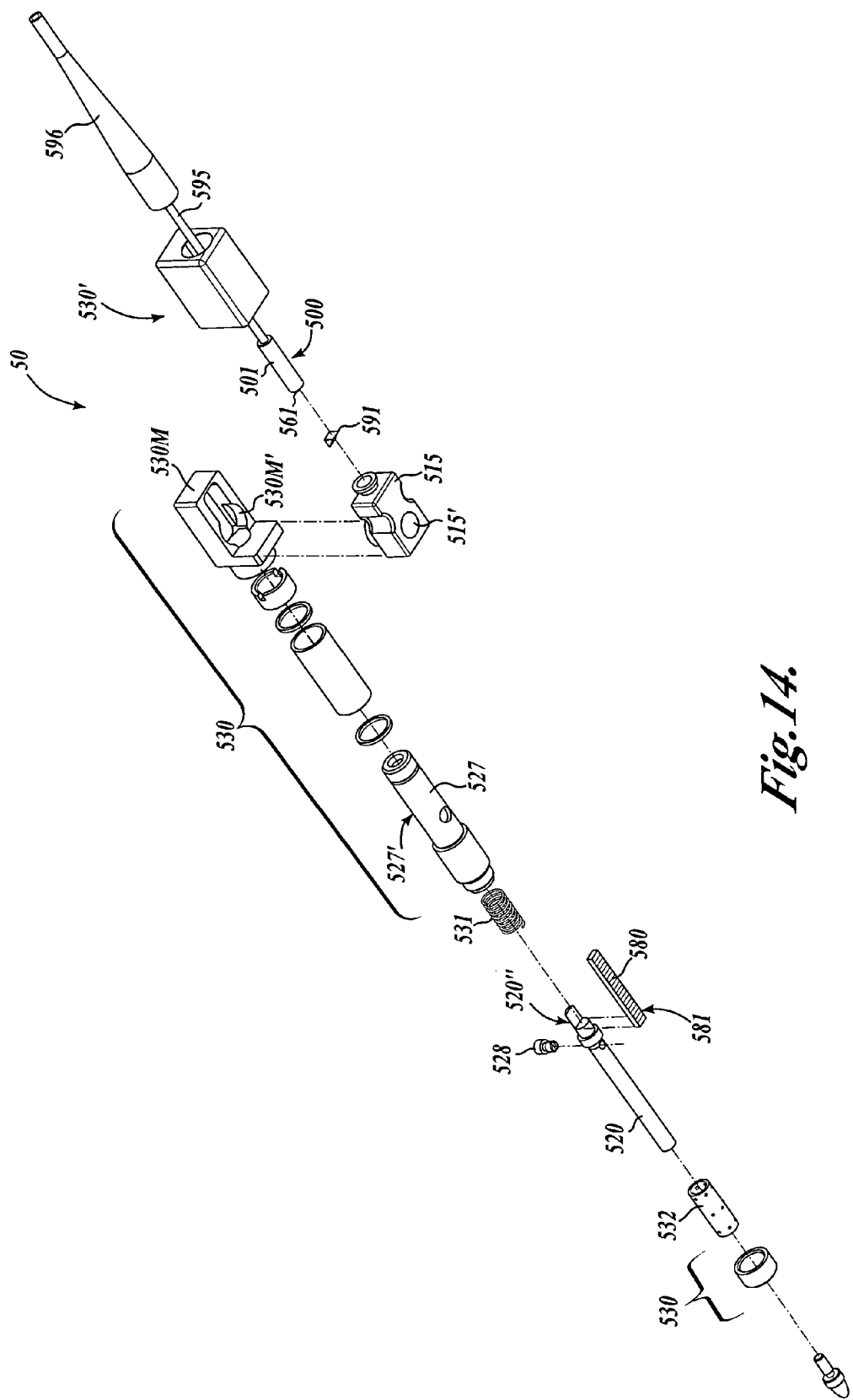
FIG. 14 is an exploded isometric view showing the smaller-sized second embodiment of a fiber-optic linear gauge according to this invention that is shown in FIG. 12, as seen from a different viewpoint from that of FIG. 13.

As shown in FIGS. 12–14, one difference between the generic fiber-optic linear gauges 40 and 50 is that the base element 515 is configured to position the ferrule 501 of the readhead 500 parallel to the axis of the linear gauge 50. The base element 515 includes a through-hole 515' such that the readhead 500 can view the scale grating 580 through hole 515' with the aid of an optical path deflecting element or prism 591. The design considerations related to the deflecting element or prism 591 have been previously described in the incorporated '312 Application, and other incorporated Applications. Basically, the deflecting element or prism 591 deflects both the illumination projected from the readhead 500 to the scale grating 480, and the pattern light arising from the scale grating 480 and returning to the readhead 500, at a 90-degree angle as illustrated in FIG. 12 and described in the incorporated Applications.

The base element 515 has a vertically extending bifurcated portion surrounding the through-hole 515' (see FIG. 13) and the top of the bifurcated portions 515" abut a positioning surface 530M' (see FIG. 14) of the frame/mounting member 530M, in order to provide a first one of the features that determines the optical gap, that is the operating gap along the deflected optical path, between the scale grating 580 and the readhead 500. In one exemplary assembly and alignment method, the fiber-optic readhead 500 is inserted to a desired depth into the base element 515 and positioned along the axis of the base element 515 in a manner analogous to that previously described for the fiber-optic readhead 300 along the axis of the rotationally alignable element 335. If desired, a gauge, or fixture, or the like may be used to determine the insertion depth, and the fiber-optic readhead 500 is secured to the base element 515 by a set screw, or adhesive, or the like, to provide a second one of the features that sets the optical gap between the fiber-optic readhead 500 and the scale grating 580 when the linear gauge 50 is assembled. At the same time, the readhead 500 may be rotationally aligned about its axis, which in this case establishes what may be regarded as the lateral alignment of the fiber-optic readhead 500 relative to the scale grating 580. Regarding yaw alignment during assembly, when the vertically extending bifurcated portion of the base element 515 is inserted into the cylindrical bore of the frame/mounting member 530M, these two elements may be rotated relative to one another about the axis of the through-hole 515', over a small angle, to establish the proper alignment before they are locked together by an adhesive, mechanical fastener, or the like. Because of the 90 degree reflection of the optical path by the deflecting element or prism 591, this rotation establishes the yaw alignment. The scale grating 580 may be displaced along the measuring axis during this procedure, in order to provide measuring signals on the optical fibers 590 that can be used to form a lissajous pattern that can be observed and used as a basis for yaw alignment, according to calibration and alignment principles well-known in the field of optical encoders. The fiber-optic linear gauge 50 includes a strain relief boot 596, which is secured around, and against, a shoulder 515''', when the fiber-optic linear gauge 50 is fully assembled. As previously described, such strain relief protects the fiber-optic cable 595 against bending and straining at the rear of the ferrule 501.

It should be appreciated that the fiber-optic linear gauge 50 may be even further miniaturized in various other embodiments. For example, the scale grating member 581 may be as thin as 250 microns and a ferrule 501 having a diameter of 2 mm, 1 mm, or even less, may be mounted directly into an even smaller base element 515, and a smaller spindle and/or bearing may be used along with other reduced size elements. In this manner a diameter of approximately 4 to 5 mm or less, or even approximately 3.5 mm, may be provided throughout the length of various exemplary embodiments of a fiber-optic linear gauge according to this invention.

Figure 15A:
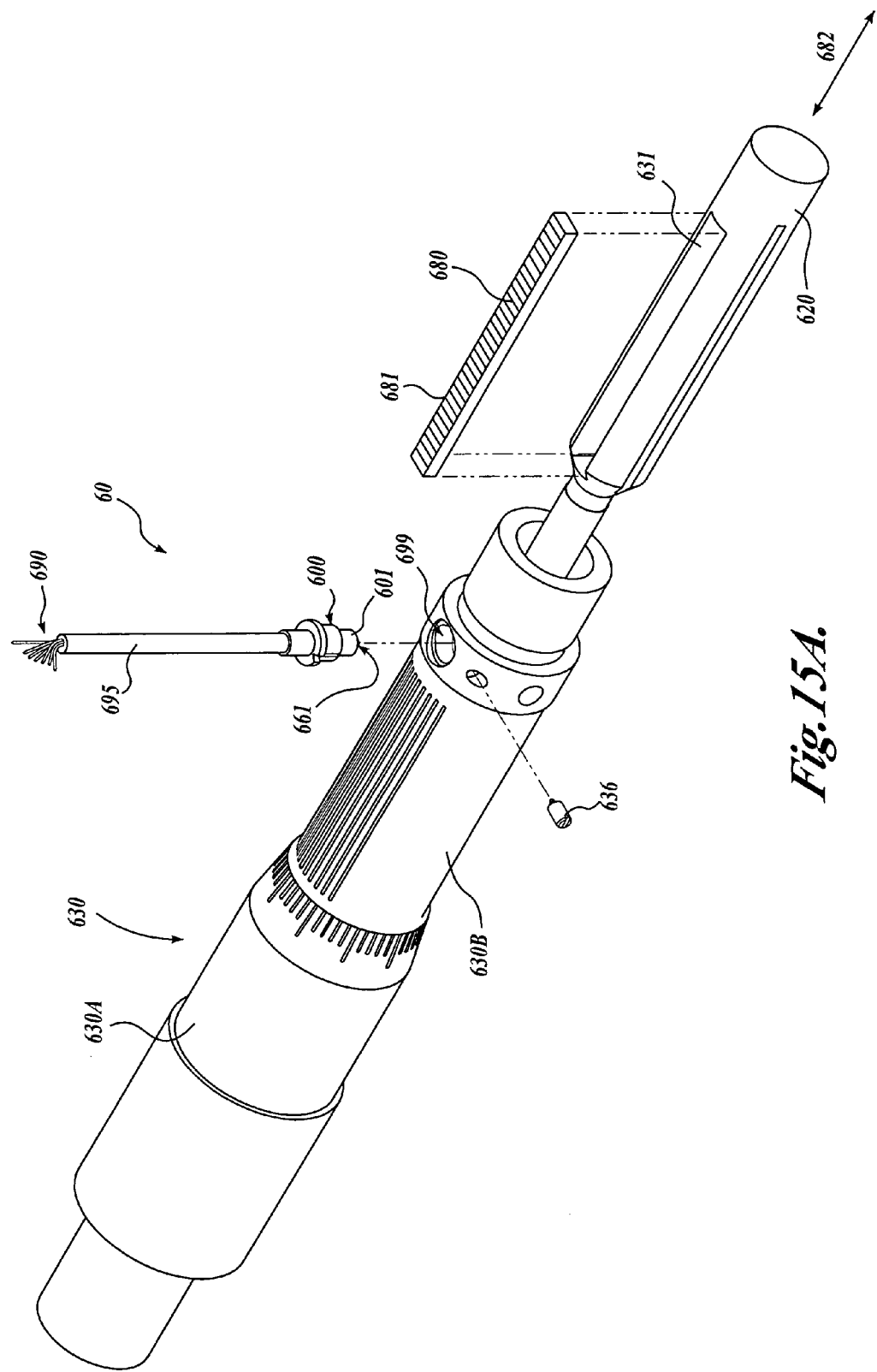
FIGS. 15A, 15B and 15C are three isometric views showing various aspects of a first embodiment of a fiber-optic micrometer head according to this invention.
Figure 15B:
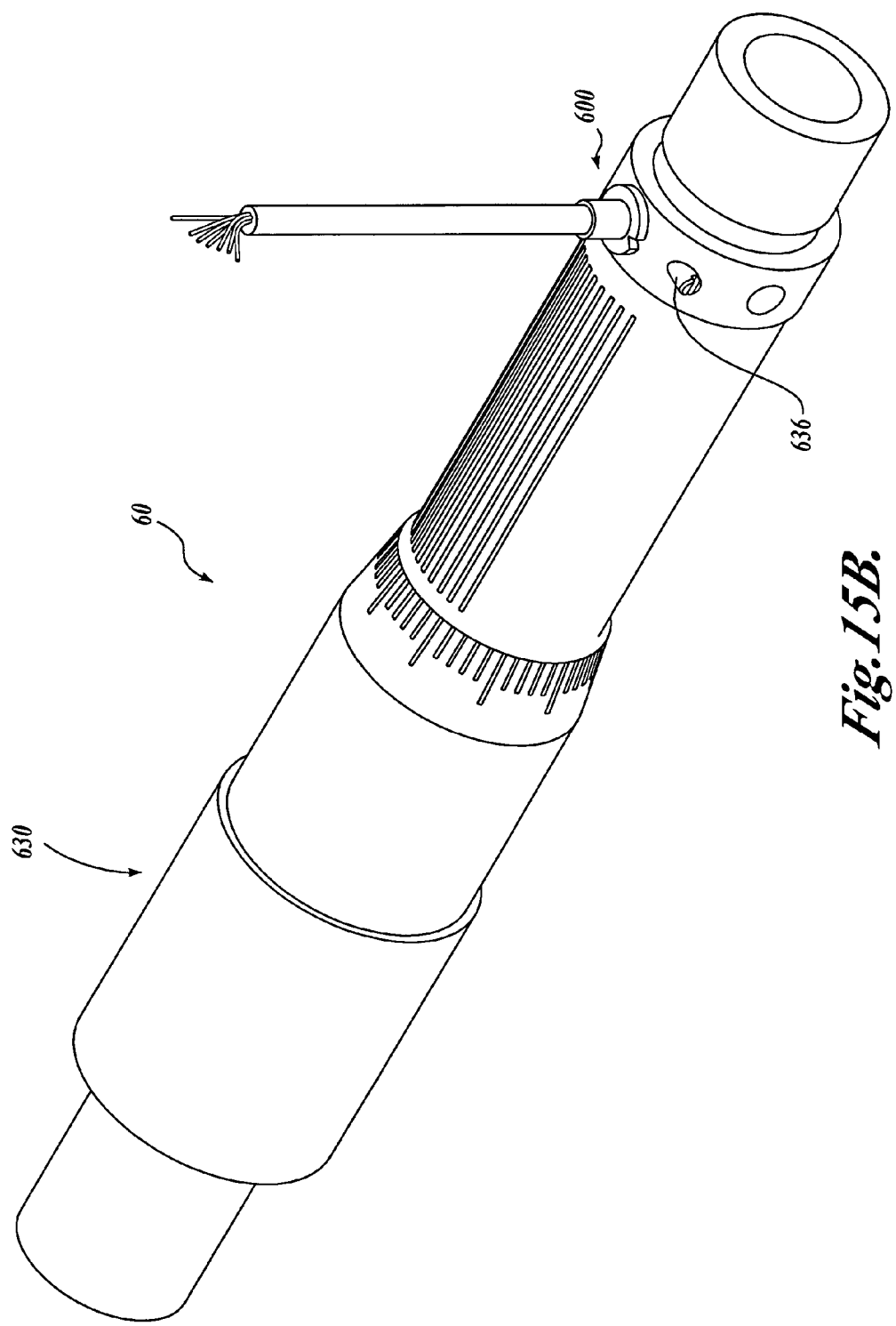
Figure 15C:
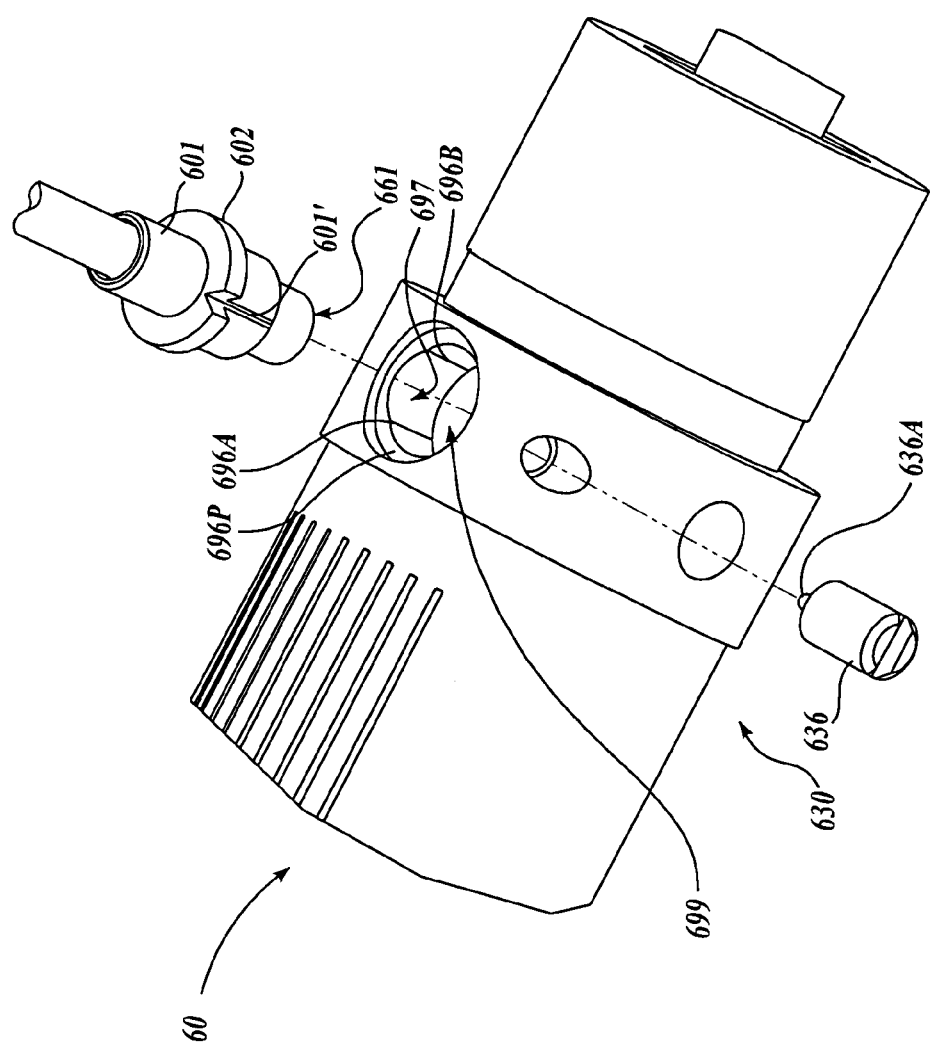

FIGS. 15A, 15B and 15C are three isometric views showing various aspects of a fiber-optic micrometer head 60 according to this invention. Of course the following discussion applies equally well to the analogous parts of a caliper-type micrometer. Analogous elements numbered 1XX–6XX in FIGS. 1–15C provide similar or identical functions, unless otherwise indicated by description or context. Therefore, only the differences between similarly numbered elements are described after any initial description of one of the similarly numbered elements. The fiber-optic micrometer head 60 emphasizes that a fiber-optic micrometer head according to this invention can be constructed in any conventional or miniature size, which is enabled by the use of a fiber-optic readhead according to this invention.

As shown in FIG. 15A, the generic fiber-optic micrometer head 60 includes a fiber-optic readhead 600, similar to those previously described, that includes a phase mask 661 (not visible) mounted to the end of a ferrule 601 and optical fibers 690 that are enclosed within the ferrule 601. The optical fibers 690 are protected within a fiber-optic cable 695 outside of the ferrule 601. It will be understood that the optical fibers 690 are routed to and from a remote optical interface and electronics circuit, such as one described further below. The fiber-optic readhead 600 including the ferrule 601 is mounted inside a housing portion 630 of the micrometer head 60. The housing portion 630 includes a rotating portion 630A and a non-rotating portion 630B, which are linked to internal elements having mating micrometer threads that drive the spindle 620 as the rotating portion 630A is rotated, as may be found in conventional commercially-available micrometers.

As best seen in the exploded view of FIG. 15C, the ferrule 601 includes a readhead positioning collar 602, which is inserted against a positioning surface 696 P that surrounds a main bore 699 that is machined into the housing portion 630 of the micrometer head 60. The positioning surface 696 P is fabricated at a desired depth relative to the eventual position of the scale grating 680 (see FIG. 15A.) As shown in FIG. 15A, the spindle 620 of the micrometer head 60 includes a precisely machined groove 631 such that when the scale grating member 681 is affixed into the groove 631 the gap between the readhead 600 and the scale grating 680 is partially established by the depth of the groove 631 and the thickness of the scale grating member 681. It will be appreciated that the positioning surface 696P is fabricated in order to establish the remainder of the gap in cooperation with the location and size of the ferrule 601 of the readhead 600 and, in particular, in view of a desired gap-governing dimension between the scale grating 680 on the surface of the scale grating member 681 and the mating surface of the collar 602 that abuts the positioning surface 696P when it is assembled. As is apparent in FIGS. 15A and 15C, the alignment of a groove 601' provided in the ferrule 601, in cooperation with the tip 636A of a set screw 636, establishes the rotational alignment of the readhead 600 relative to the scale grating 680 and the measuring axis 682. A similar ferrule configuration is described with reference to FIG. 12 and FIG. 20 in the incorporated '312 Application.

FIG. 15C also shows, in addition to the main bore 699, an offset radius surface 697 that provides two edges or axial alignment features 696A and 696B, that provide a well-defined axially aligned (precisely parallel to the axis of the bore 699, that is) pair of edges which mate with and axially align the ferrule 601 and the fiber-optic readhead 600 relative to the surface of scale grating 680. However, any other now-known or later-developed method of providing similarly well-controlled axial alignment may be used instead of the method described. For example, in the case that the ferrule 601 and the bore 699 are fabricated with diameters that fit closely enough to maintain the required axial alignment in the absence of such alignment features, the offset radius surface 697 and the resulting alignment features 696A and 696B may be omitted. FIG. 15B shows the readhead 600 assembled into the micrometer head 60 using the set screw 636.

It should be appreciated that the micrometer head 60 can be readily adapted to provide a motorized a linear actuator, simply by connecting the rotating element of a controllable motor to the rotating portion 630A and fixing the non-rotating element of the controllable motor relative to the non-rotating portion 630B. Furthermore, if desired, a miniature rotational encoder, for example using a fiber-optic readhead and rotary scale according to a technique disclosed in the incorporated '312 Application or a rotary encoder configuration analogous to that shown in FIGS. 16A–16C and described below, can be applied at the end of the rotating portion 630A of the micrometer head 60, or the like, to supplement the linear measurement capability provided by the readhead 600 and the linear scale grating member 681. That is, the pitch of the micrometer screw in combination with the rotary encoder can provide extremely fine axial position measurement and control, even better than that which can be provided by the linear scale grating member 681 in combination with the readhead 600. In such an embodiment, the readhead 600 and the scale grating carried on the scale grating member 681 can be of an absolute measurement type, and the incremental rotational measurement of the rotating portion 630A may be converted to a linear displacement value of the spindle 620, and used in combined the an absolute measurement from readhead 600, in order to provide an ultra-high resolution absolute linear displacement measurement for the spindle 620.

In another embodiment of a motorized micrometer head type of actuator, a stepping motor configuration approximately like that shown in U.S. Pat. No. 4,751,411 to Fukaya, which is incorporated herein by reference in its entirety, incorporates a fiber-optic readhead configuration analogous to that disclosed for the micrometer head 60. In such an embodiment, the shaft 7 and the motor housing 1 shown in FIG. 2 of the '411 Patent are analogous to the spindle 620 and non-rotating portion 630B described above, respectively, and the threaded portions of the shaft 7 and the female screw 12 include micrometer threads. The shaft 7 is modified with a scale-receiving groove similar to that shown in the spindle 620 and receives a similar scale grating member carrying a similar scale grating. Likewise, the motor housing 1 is modified with a readhead-receiving bore similar to that shown in the non-rotating portion 630B and receives a similar fiber-optic readhead.

FIGS. 16A, 16B and 16C are three isometric views that show various aspects of a miniature rotational positioning assembly 70, that includes miniature rotary table 710 and a housing/frame 730. In one embodiment, each side of the square housing/frame 730 is on the order of 50 mm or less, and even as small as approximately 30 mm in various embodiments. The miniature diameter of the fiber-optic readhead 700, which may be on the order two millimeters or less, along with a thin scale element 781, allow the housing/frame 730 to have a thickness dimension less than at least one of 15, 10, or 7.5 millimeters in various embodiments. The rotary table 710 interfaces with the frame 730 through a low-profile annular rotary bearing (not shown), and these elements may be preloaded against each other by a fastener 711 that extends through a hole 712 in the rotary table 710 and fastens to a rotating element that is included at the center of a bottom cover plate (not shown) that fastens to the frame 730. As best seen in the exploded bottom view FIG. 16A and the assembled bottom view FIG. 16B, a rotary or circular scale element 781 including a scale grating 780 is affixed to the interior surface of the rotary table 710, in operational alignment with a fiber-optic readhead 700. The fiber-optic readhead 700 includes an optical path deflecting element 791 analogous to the deflecting element 591 described with reference to FIG. 12. All the required gap setting and alignment procedures will be readily understood with reference to FIGS. 16A, and 16B, the incorporated references, and the previous disclosure herein. FIG. 16C shows a top view of the miniature rotational positioning assembly 70, including an actuating rotating thumb screw assembly 715, that engages with a peripheral surface of the rotary table 710 by means of friction or appropriate sets of gear teeth (not shown), or the like, in order to provide a means for fine adjustment of the rotary table 710. If desired, the actuating rotating thumb screw assembly 715 may be attached to, and driven by, a controllable motor.

With regard to the fiber-optic-readhead 700, in various exemplary embodiments, the readhead 700 is an interferometric-type readhead and the scale grating 780 is a phase grating having characteristics similar to those previously described for interferometric-type readheads. In various other embodiments, the miniature rotational positioning assembly 70 includes an absolute rotary scale and an absolute fiber-optic readhead or an absolute portion of a fiber-optic readhead that provides an absolute measurement signal based on the absolute rotary scale, according to the teachings of the incorporated '238 Application. More generally, any of the fiber-optic readheads included in the incorporated '312, '619, '453, '238 and/or '508 Applications may be used in, or readily adapted to be used in, the miniature rotational positioning assembly 70.

Of course, a miniature-diameter fiber-optic readhead and thin rotary scale arrangement analogous or identical to that shown in FIGS. 16A–16C can also be used to provide a precision fiber-optic adjustable-type protractor gauge or the like. In such a case, due to the ultra-miniature size of the fiber-optic readhead and thin rotary scale, the majority of the mechanical parts may be similar to those used in known commercially-available precision adjustable-type protractor gauges.

Figure 17A:
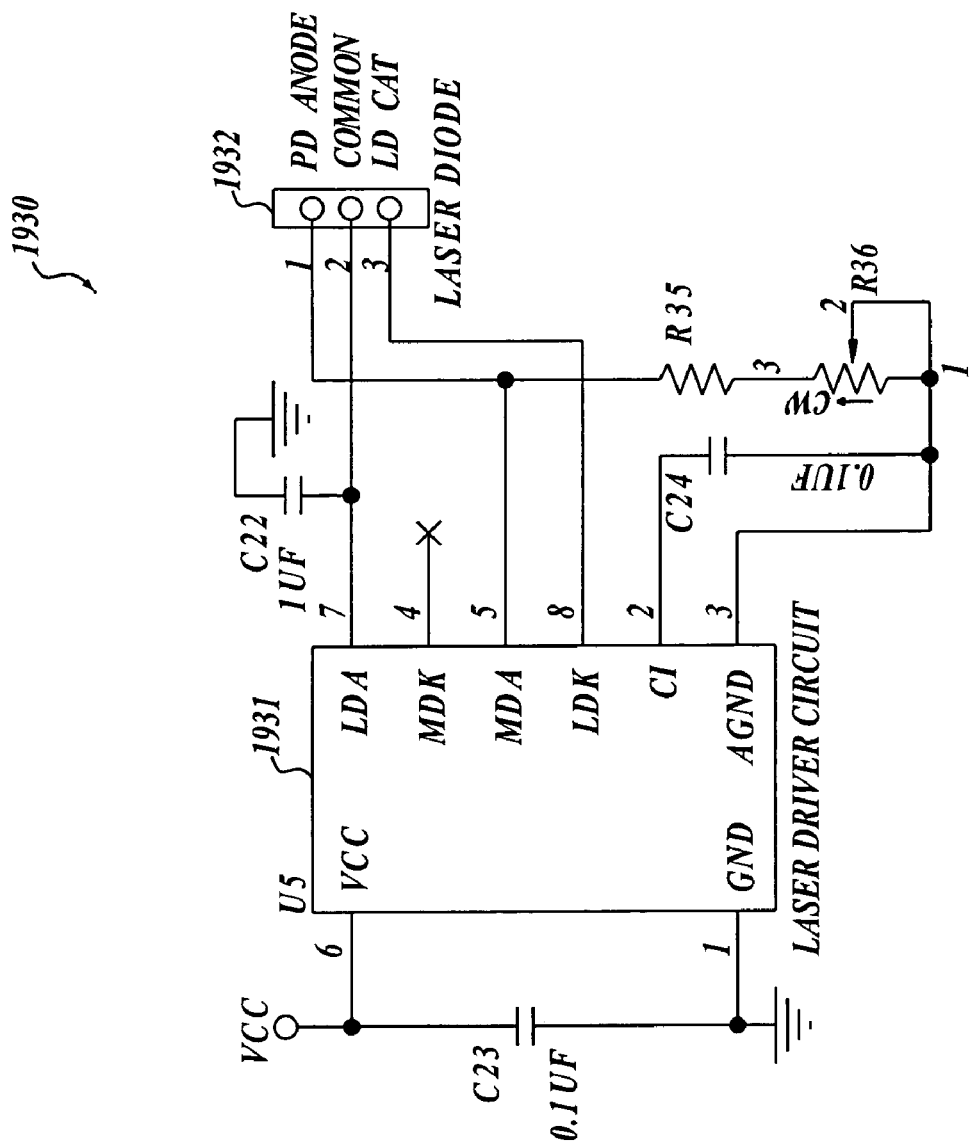
FIGS. 17A and 17B are schematics of first and second portions of a remote optical interface/electronics circuit that is usable with any all-optical fiber-optic gauge according to this invention.
Figure 17B:
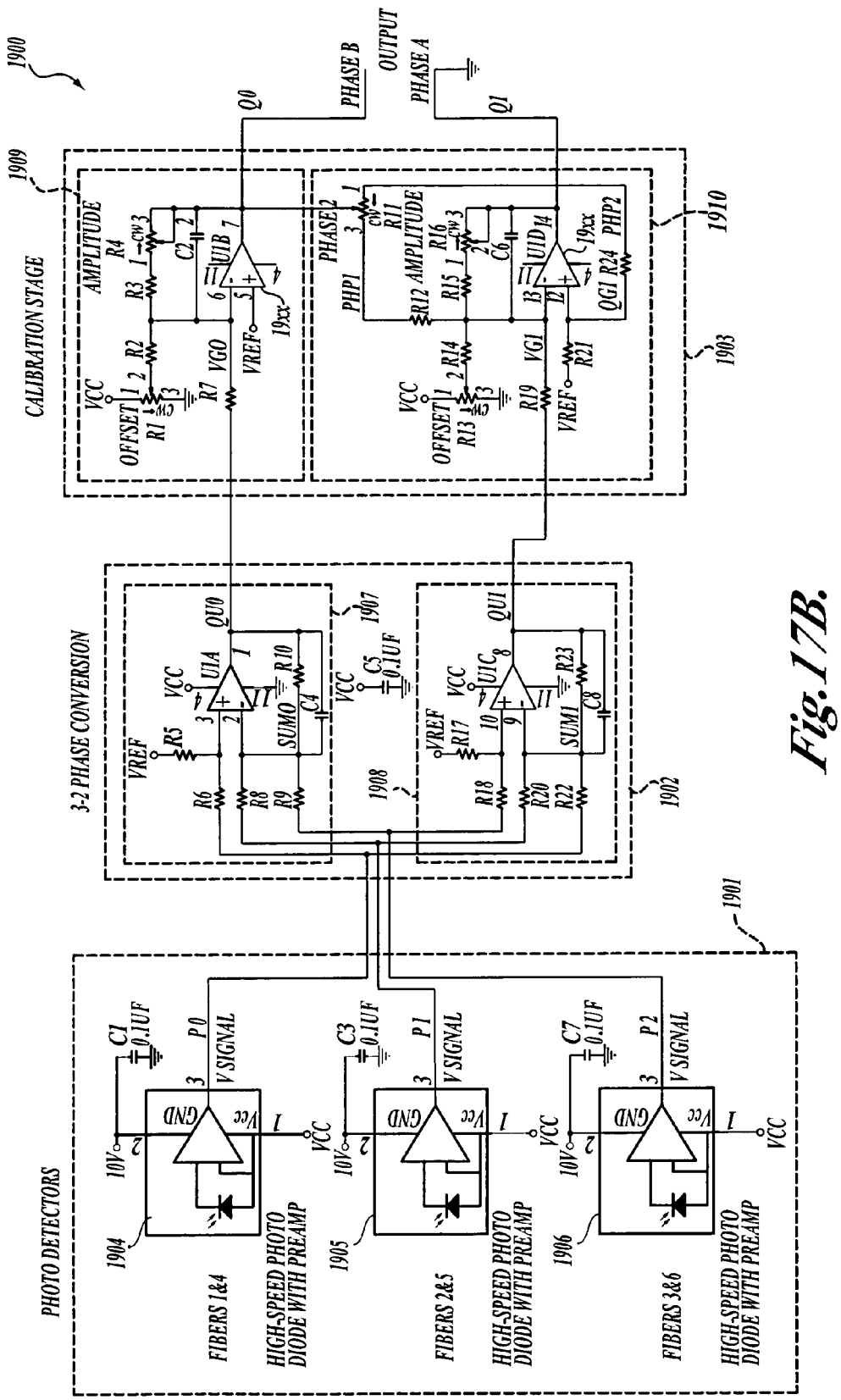

FIGS. 17A and 17B show schematics of a remote optical interface/electronics circuit box that is usable with any of the previously described fiber-optic gauges according to this invention. FIG. 17A is a detailed schematic of one exemplary embodiment of an illumination circuit which includes a laser diode driver circuit portion and a laser diode assembly 1932, in order to provide an illumination light for the light source fiber of a fiber-optic readhead. The circuit 1930 includes a continuous wave (CW) laser diode driver chip 1931. In one exemplary embodiment, the laser diode driver chip 1931 is the commercially available iC-WK, 2.4 volt CW laser diode driver, which includes circuitry protecting against electrostatic discharge, excessive temperature, and overcurrent, and is available from iC-Haus GmbH, Bodenheim is Germany. In the example shown in FIG. 17A, the diode driver chip 1931 is powered by a supply voltage VCC through pin 6, which is coupled to ground through a capacitor C23. In one embodiment, VCC is 5 volts. GND (pin 1) is connected directly to ground. CI (pin 2), capacitance for power control, is connected to the photodiode anode through a capacitor C24, a potentiometer R36, and a resistor R35. The potentiometer R36 adjusts the light power output of the laser diode by feeding back the current from the photodetector in the laser diode assembly. The values of R35 and R36 may be chosen such that the laser diode power output ranges between approximately 1 mW and 2 mW, given the tolerance of the photodiode transfer function. In one embodiment, R35 is 2.49 kΩ and R36 is 20 kΩ. The capacitor C24 determines the recovery time constants and start-up time; in one embodiment, C24 is chosen to be 0.1 µF. As further shown in FIG. 17A, MDA (pin 5), a monitor input, is connected to the photodiode anode of the laser diode assembly 1932. LDA (pin 7), a laser supply, is connected to pin 2 (common) on the laser diode assembly 1932. LDA is connected through ground through C22, a 1 µF capacitor. LDK (pin 8) is the output of the internal power transistor that regulates the laser current. Pin 8 is connected to pin 1 (the laser diode cathode) on the laser diode assembly 1932. All component values are chosen for compatibility with the laser diode assembly 1932. In one embodiment, the laser diode assembly 1932 is the laser diode assembly 300-0054-00 commercially available from Photonics Products Ltd., Hertfordshire, UK. The laser diode assembly 300-0054-00 emits coherent light at a wavelength of 635 nm and has a nominal output power of 2.0 mW.

FIG. 17B is a detailed schematic of one exemplary embodiment of one exemplary circuit 1900 which is usable for receiving and processing the optical signals received through the fiber-optic receiver channels of various fiber-optic readheads usable in various embodiments of the fiber-optic gauges disclosed above. In this particular embodiment, the circuit 1900 is suitable for receiving optical input signals from a fiber optic readhead that spatially filters a periodic light pattern that moves in correspondence to the relative displacement of a scale grating to provide a three-phase output signal.

As shown in FIG. 17B, the circuit 1900 includes a photo detector block 1901, a 3-to-2 phase conversion block 1902, and a calibration stage block 1903. The photo detector block 1901 consists of three identical signal channels that included high-speed photo diodes with preamps. In one embodiment, each of the photo detectors and preamps 1904, 1905, and 1906 are integrated into a single package such as the part S6468 available from by Hamamatsu Corporation, Bridgewater, N.J. The S6468 package includes a built-in pre-amp. If the photo detectors 1904–1906 are of a type that is unable to sink current (such as the part S6468), then VCC in the block 1901 is powered by a supply between +5V and +10V, while the amplifiers of the 3-to-2 phase converter circuit block 1902 are powered by a supply VCC' between +5V and 0V. This arrangement insures that the photo detectors 1904–1906 can always source currents and never need to sink current.

Regarding the circuit block 1901, in the example shown, Pin 1 (VCC) on each photodiode is connected to the supply voltage VCC. Pin 2 on each photodiode is connected to ground through a 0.1 µF capacitor C1, C3, or C7. Pin 3 on each photodiode is connected to the 3-to-2 phase conversion block 1902. In the particular example shown, each photodiode 1904–1906 is connected to receive optical input signals of one of three phases from the fiber-optic readhead via a pair of optical fibers from a "balanced pair" of fiber optic receiver channels as described in the incorporated fiber-optic readhead Applications. For example, fibers designated 1 and 4 are connected to illuminate photodiode 1904 and the associated preamp outputs a signal P0 to the 3-to-2 phase conversion block 1902, fibers 2 and 5 are connected to illuminate photodiode 1905 and the associated preamp outputs a signal P1 to the 3-to-2 phase conversion block 1902, and fibers 3 and 6 are connected to illuminate photodiode 1906 and the associated preamp outputs a signal P0 to the 3-to-2 phase conversion block 1902.

The 3-to-2 phase converter block 1902 inputs the three phase signals P0-P2, combines them in various combinations as shown, and amplifies them to generates a pair of output quadrature signals QU0 and QU1, according to signal processing principles described in the incorporated '312 Application. The 3-to-2 phase conversion block 1902 includes two signal combining amplifier circuits 1907 and 1908. In one exemplary embodiment, each amplifier circuit 1907 and 1908 includes one element, U1A and U1C respectively, of an 80 MHz precision quad op-amp, such as part LT1802 available from Linear Technology, through Linear Express, Milpitas, Calif., USA.

In the example shown, Pin 11 of the quad op-amp is connected directly to ground. Pin 4 of the op-amp is connected to the supply voltage VCC'. The output signal P0 from the photodiode 1904 is connected to the non-inverting input of op-amp U1A through a resistor R6, and connected to the feedback loop of the op-amp U1C through a resistor R22. The output signal from the photodiode 1905 is connected to the inverting input of the op-amp U1A through a resistor R8, and connected to the inverting input of the op-amp U1C through a resistor R20. The output signal from the photodiode 1906 is connected to the feedback loop of the op-amp U1A through a resistor R9, and connected to the non-inverting input of the op-amp U1C through a resistor R18. The resistor R5 and feedback resistor R10 set the gain for the amplifier circuit 1907, and resistor R17 and feedback resistor R23 set the gain for the amplifier circuit 1908. The gain is arbitrary and can be changed by changing the resistor values. In one exemplary embodiment, VREF is set to +2.5V.

The calibration stage block 1903 inputs and amplifies the quadrature signals QU0 and QU1 and modifies their offset, amplitude, and phase difference using the five trim potentiometers R1, R4, R11, R13, and R16, which are marked with their various calibration functions in FIG. 17B, in order to provide two calibrated quadrature outputs Phase A and Phase B. The calibration stage block 1903 consists of two similar calibrating amplifier portions 1909 and 1910, one for each of the quadrature signals QU0 and QU1. The signal QU0 connects through a resistor R7 to the inverting input of op-amp U1B. The signal QU1 connects through a resistor R19 to the inverting input of op-amp U1D. The non-inverting input of U1D is connected to VREF through a resistor R21. The non-inverting input of op-amp U1B is connected directly to VREF. In one exemplary embodiment, op-amps U1B and U1D are provided from the same precision quad op-amp as the op-amps U1A and U1C of the 3-to-2 phase conversion block 1902, as outlined above.

In operation, the scale grating of the fiber-optic gauge connected to the circuit 1900 is displaced along its measuring axis in order to provide measuring signals on the optical fibers that are input to the circuit block 1901. The two quadrature outputs Phase A and Phase B are used to form a lissajous pattern that can be observed and used as a basis for adjusting the various trim potentiometers R1, R4, R11, R13, and R16, in order to calibrate and remove various error components from the two quadrature outputs Phase A and Phase B, according to calibration principles well-known in the field of optical encoders. The resulting analog quadrature outputs Phase A and Phase B can be analyzed and/or signal processed according to well-known techniques to determine high precision displacement measurement values for the fiber optic gauge.

It should be appreciated that although the circuit 1900 described above is suitable for a three-phase fiber-optic gauge, the same circuit techniques are readily adaptable for fiber-optic gauges that output a different number of phases. For example, in the case of a two phase fiber-optic gauge that directly outputs quadrature optical signals, such signals may simply be input to photodetectors circuits such as the circuits 1904 and 1905. The 3-to-2 phase conversion circuit 1902 is not needed in this case, so the outputs from these circuits may simply be amplified according to known methods and input to the calibration stage 1909, which otherwise operates as previously described.

FIG. 18 shows a standard FC-type polarization (PM) maintaining fiber-optic connector 1000 including a standard-diameter ferrule 1002, wherein a fiber-optic readhead according to this invention can be substituted for the ferrule 1002 in the connector. For example, one such fiber-optic connector is Part HPC-S8.6-PM, available from Diamond SA, Losone, Switzerland. Such connectors maintain the rotational orientation of the ferrule 1002, and include an axial spring loading for the ferrule 1002. In that case, within appropriate tolerances an extension dimension F is somewhat variable, and the end of the ferrule 1002 can be spring-loaded against a first external mating surface when it is assembled, to establish a desired gap between the end of the ferrule and a second external surface, if desired. Such an arrangement is shown in FIG. 19, which shows how a fiber-optic readhead 201' can be substituted for the ferrule 1002 in fiber-optic connector 1000, to provide a field-replaceable fiber-optic readhead assembly for various suitably-adapted fiber optic gauges disclosed herein.

In particular, FIG. 19 shows a portion of fiber-optic lever gauge 20' that is identical to the fiber-optic lever gauge 20 shown in FIG. 5, except as described below. Parts numbered similarly in FIGS. 5 and 19 will be understood to be similar or identical parts when not described below. The portion of the fiber-optic lever gauge 20' shown in FIG. 19 includes portions of flexures 211" and 211''', a portion of a cover 230', a portion of a scale grating 281 and scale grating 280, and a fiber-optic connector 1000' wherein the ferrule 1002 is replaced by an extended ferrule 201' that is integral to a fiber-optic readhead 200'. The extended ferrule 201' may have external features that are identical to the ferrule 1002, except that its length is chosen such that it is spring-loaded against an abutting surface 1806, described further below, when the connector 1000' is assembled to the fiber-optic readhead 20'. A base element 215' is modified compared to the base element 215 shown in FIG. 5. The base element 215' has a dimension H between a surface that abuts the cover 230' and an internal abutting surface 1806 that locates the end of the extended ferrule 201', and a dimension G between a surface that abuts a central cylindrical element of the fiber-optic connector 1000' and the abutting surface 1806, as shown. The length of the extended ferrule 201', the dimension G, and the dimension H, in combination establish a desired gap between the readhead 200' and a nominally located scale grating 280. The base element 215' also includes internal threads to mate with those of the fiber-optic connector 1000' and the threaded region 1805. The base element 215' also includes a central cylindrical portion that mates with a cylindrical slot in the end of the fiber-optic connector 1000', as shown, and that also includes an angular orientation key feature that is complementary to a standard angular orientation key feature included in the fiber-optic readhead 1000', for example proximate to a region indicated by the arrow 1807. Such keying features establish the proper rotational alignment between the phase masks 261' of the fiber-optic readhead 200' and the scale grating 280. Thus, more generally, any of the fiber-optic gauges described herein that are of sufficient size may have a portion that is adapted to receive a standard interchangeable fiber-optic connector 1000', or the like, wherein the fiber-optic connector includes a modified ferrule that is integral with a fiber-optic readhead, as described above.

While this invention has been described in conjunction with the exemplary embodiments outlined above, it is evident that the embodiments and design factors described above are indicative of additional alternative embodiments, modifications, and variations, as will be apparent to those skilled in the art. Accordingly, the embodiments of the invention, as set forth above, are intended to be illustrative, not limiting. Various changes may be made without departing from the spirit and scope of the invention.

The invention claimed is:

1. A precision fiber-optic gauge that senses displacement of a scale grating and outputs all-optical displacement measuring signals, the gauge comprising:
    a first member comprising a housing that defines a hole;
    a rotationally alignable member that is received in the hole;
    a scale grating coupled to a second member that is movable along a measuring axis relative to the first member; and
    a fiber-optic readhead that is coupled to the first member using the rotationally alignable member, the fiber-optic readhead arranged in an operable position relative to the scale grating, the readhead transmitting light to the scale grating, the readhead comprising at least two fiber-optic detector channels for receiving and spatially filtering light from the scale grating to sense the displacement of the scale grating and outputting all-optical measuring signals based on the received light;
    wherein;

the readhead is coupled to the rotationally alignable member and is capable of being rotationally aligned with respect to the hole about an axis that is nominally perpendicular to the surface of a phase grating that is part of the fiber-optic readhead and capable of being locked in place in relation to the hole at a desired alignment; and the gauge outputs all-optical measuring signals.

2. The gauge of claim 1, wherein the gauge is selected from a group consisting of a lever gauge, linear gauge, a micrometer, a micrometer head, and rotary stage.

3. The gauge of claim 1, wherein:
the readhead comprises an absolute type fiber-optic readhead that provides output signals usable to provide absolute type measurement values; and
the scale grating comprises multiple periodic scale gratings having different periods.

4. The gauge of claim 1, further comprising a light deflecting element provided to deflect a light path of the fiber-optic readhead between the readhead and the scale grating.

5. The gauge of claim 1, wherein at least one outside dimension of the gauge is, at most, 10 millimeters.

6. The gauge of claim 1, wherein:
the second member comprises a spindle shaft that comprises a groove that carries the linear scale grating therein;
the spindle shaft is included in one of a micrometer and a micrometer head; and
the readhead comprises an interferometric-type fiber-optic readhead.

7. The gauge of claim 1, wherein:
the second member comprises a rotating member of a rotary stage;
the scale grating comprises at least a portion of a circular or cylindrical scale grating; and
the readhead comprises an interferometric-type fiber-optic readhead.

8. The gauge of claim 1, wherein the first and second members are included in a lever gauge, and the readhead comprises an interferometric-type fiber-optic readhead.

9. The gauge of claim 1, wherein the locking is accomplished by at least one of a clamp, a set screw, and an adhesive.

10. The gauge of claim 1, wherein the rotationally alignable member comprises a standard fiber-optic connector that generally surrounds the fiber-optic readhead.

11. The gauge of claim 1, wherein the rotationally alignable member comprises an element that mates with a corresponding element defined in the hole, such that the mating of the two elements defines the desired alignment.

12. The gauge of claim 11, wherein the corresponding element defined in the hole comprises linear features aligned parallel to the axis of the hole that are usable to align the element of the rotationally alignable member precisely parallel to the axis of the hole.

13. The gauge of claim 11, wherein the mating of the two elements further defines the nominal gap of the readhead relative to the scale grating internal to the gauge.

14. The gauge of claim 1, wherein the fiber-optic readhead is of a type selected from a group consisting of an imaging type readhead, an absolute type readhead, a two-dimensional type readhead, and an interferometric type readhead.

15. The gauge of claim 14, wherein the readhead comprises multiple fiber-optic detector channels having respective phase grating masks for receiving a periodic light pattern that moves in correspondence to the scale grating so as to detect the location of the scale grating.

16. The gauge of claim 15, wherein the readhead comprises an interferometric type fiber-optic readhead, and the scale grating comprises a phase grating such that the periodic light pattern that moves in correspondence to the scale grating is an interferometric light pattern.

17. The gauge of claim 15, wherein the readhead comprises an imaging type fiber-optic readhead, and the periodic light pattern that moves in correspondence to the scale grating is an image light pattern.

18. The gauge of claim 14, further comprising a remote interface box comprising at least one electronic light source and an array of photodetectors that interface with the fiber-optic precision measuring gauge.

19. The gauge of claim 18, wherein the remote interface box outputs electrical signals which provide a measuring resolution less than or equal to one of 50, 20, and 10 nanometers.

20. A method for operating a precision fiber-optic gauge that senses displacement of a scale grating and outputs all-optical displacement measuring signals, the gauge comprising:
a first member comprising a housing that defines a hole;
a rotationally alignable member that is received in the hole;
a scale grating coupled to a second member that is movable along a measuring axis relative to the first member; and
a fiber-optic readhead that is coupled to the first member using the rotationally alignable member, the fiber-optic readhead arranged in an operable position relative to the scale grating, the readhead transmitting light to the scale grating, the readhead comprising at least two fiber-optic detector channels for receiving and spatially filtering light from the scale grating to sense the displacement of the scale grating and outputting all-optical measuring signals based on the received light;
the method comprising:
(a) operably positioning the fiber-optic readhead relative to the scale grating, comprising the steps of rotationally aligning the rotationally alignable member about an axis that is nominally perpendicular to the surface of a phase grating that is part of the fiber-optic readhead, and locking the rotationally alignable member in place in relation to the hole at a desired alignment;
(b) inputting light arising from the scale grating to the fiber-optic readhead; and
(c) producing all-optical measuring signals from the fiber-optic readhead.

21. The method of claim 20, wherein step (a) further comprises positioning the rotationally alignable member to define a nominal operating gap between the readhead and the scale grating.

* * * * *